(12) United States Patent
Inagaki

(10) Patent No.: US 8,793,693 B2
(45) Date of Patent: Jul. 29, 2014

(54) APPARATUS AND METHOD FOR PREDICTING A PROCESSING TIME OF A COMPUTER

(75) Inventor: Takahiro Inagaki, Ama (JP)

(73) Assignee: Fujitsu Limited, Kawasaki (JP)

( * ) Notice: Subject to any disclaimer, the term of this patent is extended or adjusted under 35 U.S.C. 154(b) by 207 days.

(21) Appl. No.: 13/428,029

(22) Filed: Mar. 23, 2012

(65) Prior Publication Data

US 2012/0311586 A1   Dec. 6, 2012

(30) Foreign Application Priority Data

May 31, 2011   (JP) .................................. 2011-122929

(51) Int. Cl.
   *G06F 9/46*   (2006.01)
(52) U.S. Cl.
   USPC ......................................................... 718/100
(58) Field of Classification Search
   None
   See application file for complete search history.

(56) References Cited

U.S. PATENT DOCUMENTS

| 5,465,354 | A | * | 11/1995 | Hirosawa et al. | ............. 718/106 |
| 2009/0328046 | A1 | * | 12/2009 | Proctor et al. | ................. 718/102 |

FOREIGN PATENT DOCUMENTS

| JP | 4-326434 | 11/1992 |
| JP | 2005-208767 | 8/2005 |
| JP | 2010-231694 | * 10/2010 |

* cited by examiner

*Primary Examiner* — Emerson Puente
*Assistant Examiner* — Sisley Kim
(74) *Attorney, Agent, or Firm* — Staas & Halsey LLP

(57) ABSTRACT

Load information and a first processing time are provided in association with each of a plurality of first time segments that each have a fixed duration time and are included in a first time period, where the load information indicates a load condition of a target computer that executed a target job during the each first time segment, and the first processing time indicates a running time of the target job during the each first time segment. One or more first time segments each having a predetermined analogous relationship with a second time segment in a second time period during which the target job is expected to be executed by the target computer are selected to predict a second processing time indicating a running time of the target job during the second time period based on the first processing times associated with the selected one or more first time segments.

11 Claims, 22 Drawing Sheets

FIG. 4

| JOB NAME | STARTING DAY | EXPECTED STARTING TIME | EXPECTED ENDING TIME | PREDICTED DATA PROCESSING TIME | PREDICTED ENDING TIME | PARAMETER | WHO'S LOADED | USER NAME | COMMENT |
|---|---|---|---|---|---|---|---|---|---|
| J1 | WEDNESDAY | 10:00 | 10:15 | - | - | file data 1.dat | - | root | CUSTOMER MANAGEMENT |
| J2 | 25TH | 9:00 | 13:30 | - | - | file data 2.dat | - | root | CUSTOMER MANAGEMENT |
| ... | ... | ... | ... | ... | ... | ... | ... | ... | ... |
| Jm | MONDAY | 18:15 | 19:30 | - | - | file data n.dat | - | xxx | ... |

SCHEDULE TABLE — 400

400-1, 400-2, ......, 400-m

APPARATUS AND METHOD FOR PREDICTING A PROCESSING TIME OF A COMPUTER

CROSS-REFERENCE TO RELATED APPLICATION

This application is based upon and claims the benefit of priority of the prior Japanese Patent Application No. 2011-122929, filed on May 31, 2011, the entire contents of which are incorporated herein by reference.

FIELD

The embodiments discussed herein are related to apparatus and method for predicting a processing time of a computer.

BACKGROUND

Some ordinary technologies for enabling steady and low cost operations of systems are to automatically power on or off a server, to automatically start or stop a service, to automatically schedule jobs, etc. Meanwhile, such a system predicts data processing time for carrying out jobs. If it is predicted that some of the jobs will continue over expected ending time, those jobs are manually avoided from continuing in order that daily work will finish in scheduled time.

A related art is, e.g., to calculate expected data processing time for a job scenario in a case where preregistered events are rescheduled and the job scenario is carried out while an effect of another job scenario expected for a period of time after being rescheduled is taken into account. Further, a related art is to change programs depending upon job running condition. Further, a related art is to divide achieved job running time into components and to pile such data up, and to predict job running time on the basis of the piled-up job processing history data so as to schedule the jobs.

Japanese Laid-open Patent Publications No. 2010-231694, No. 2005-208767 and No. H04-326434 discuss those related arts.

SUMMARY

According to an aspect of the invention, apparatus and method for predicting a processing time of a computer is provided. Load information and a first processing time are provided in association with each of a plurality of first time segments that each have a fixed duration time and are included in a first time period, where the load information indicates a load condition of a target computer that executed a target job during the each of the plurality of first time segments, and the first processing time indicates a running time of the target job during the each of the plurality of first time segments. One or more first time segments each having a predetermined analogous relationship with a second time segment included in a second time period during which the target job is expected to be executed by the target computer are selected from among the plurality of first time segments, based on the load information associated with the plurality of first time segments. Then a second processing time indicating a running time of the target job that is expected to be executed during the second time period is predicted based on the first processing times associated with the selected one or more first time segments.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4 is a diagram illustrating an example of what is stored in a schedule table, according to an embodiment;

DESCRIPTION OF EMBODIMENTS

There is a problem in the ordinary technologies in that it is difficult to predict data processing time desirable for carrying out jobs. As load condition of a computer to be loaded with the jobs, e.g., changes depending upon amounts of work and data size which change day by day, it is difficult to predict data processing time for the jobs to be carried out by the computer.

Embodiments of a prediction program, a prediction device and a prediction method will be explained in detail with reference to the drawings below.

First Embodiment

Figure 1:
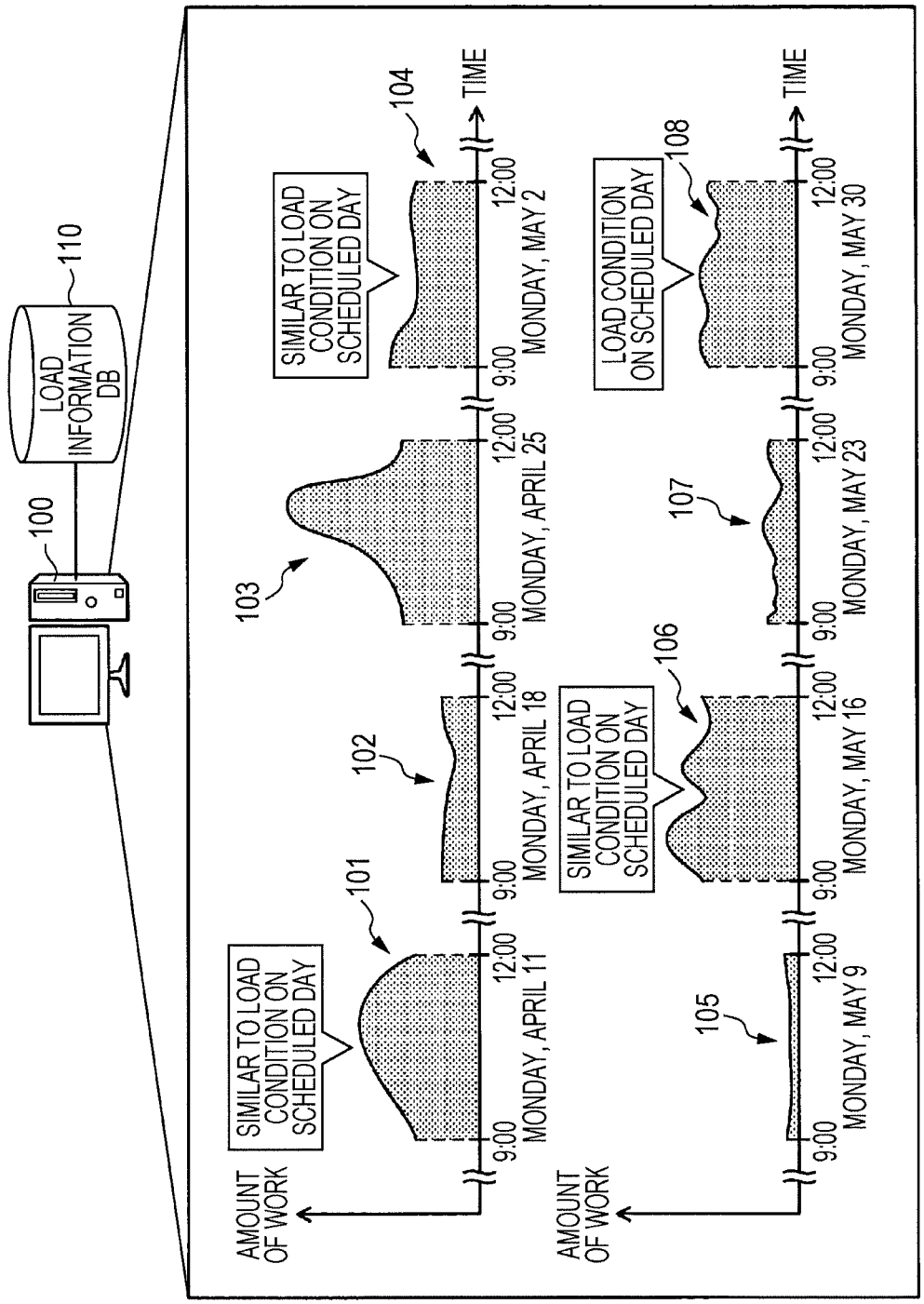
FIG. 1 is a diagram illustrating an example of practicing a prediction method, according to an embodiment.

FIG. 1 is a diagram illustrating an example of practicing a prediction method, according to an embodiment. FIG. 1 depicts a prediction device 100, i.e., a computer which can access a load information database (DB) 110 and predicts data processing time for a job to be processed by a target computer.

The term job used here means a unit of work processed by the target computer. Specifically, e.g., a job is part or all of programs included in a series of programs which achieves batch or online work.

The load information DB 110 is a database in which load information indicating load condition of a target computer to be loaded with a job to be processed for every period of time of a certain segment length into which time is segmented is stored. The period of time of the certain segment length means each of periods of time into which the time axis is segmented by any time width having been set. The period of time may be, e.g., each of periods of time into which the time axis is divided on a daily or weekly basis. Hereinafter, a period of time of a certain segment length will be also expressed as "a time segment".

The load information indicating load condition of a target computer indicates, e.g., an amount of work loaded onto the target computer which changes as time passes. Specifically, e.g., the load information indicates an amount of work loaded onto the target computer at regular intervals (e.g., every one minute, ten minutes, one hour, etc.) in each of the periods of time. The amount of work loaded onto the target computer may be represented by an amount of use of a central processing unit (CPU) of the target computer or an amount of use of an input/output (I/O) of the target computer.

The load condition of the target computer changes depending upon the number of programs being run or size of data being processed in each of the programs. Further, data processing time for a job changes depending upon the load condition of the target computer even if the same target computer carries out the job. If, e.g., a target computer to be loaded with a job is running a program which differs from the job to be processed, the data processing time for the job tends to be longer than that in a case where the target computer runs no other programs.

Thus, according to the first embodiment, calculate data processing time for a job to be carried out on a scheduled day on the basis of achieved data processing time for a job carried out on a day giving a sign that load condition of a target computer is similar to that on the scheduled day, so as to predict the data processing time for the job taking the load condition of the target computer which changes day by day into account. That is, the prediction device 100 calculates predicted data processing time for a job expected to be carried out in an expected period of time on the basis of achieved data processing time for a job carried out in the past specifying same content to be processed as content specified by the job expected to be carried out.

An exemplary prediction process to be run by the prediction device 100 will be explained below. Segment the time axis into periods of time (time segments) each having a certain segment length, e.g., on a daily basis, as explained here. Further, a job J to be carried out every Monday will be explained as an exemplary job to be processed.

FIG. 1 illustrates graphs 101-108 each indicating an amount of work loaded onto a target computer which changes as time passes in a rectangular coordinate system formed by a horizontal and vertical axes representing time and the amount of work, respectively. The target computer is to be loaded with the job J to be processed.

The graph 101 indicates change in the amount of work loaded onto the target computer from 9 to 12 o'clock, Monday, April 11. The graph 102 indicates change in the amount of work loaded onto the target computer from 9 to 12 o'clock, Monday, April 18. The graph 103 indicates change in the amount of work loaded onto the target computer from 9 to 12 o'clock, Monday, April 25. The graph 101 indicates change in the amount of work loaded onto the target computer from 9 to 12 o'clock, Monday, May 2.

The graph 105 indicates change in the amount of work loaded onto the target computer from 9 to 12 o'clock, Monday, May 9. The graph 106 indicates change in the amount of work loaded onto the target computer from 9 to 12 o'clock, Monday, May 16. The graph 107 indicates change in the amount of work loaded onto the target computer from 9 to 12 o'clock, Monday, May 23. The graph 108 indicates change in the amount of work loaded onto the target computer from 9 to 12 o'clock, Monday, May 30.

An exemplary case, in which data processing time for the job J starting to be carried out by the target computer to be loaded after 12 o'clock, Monday, May 30 is calculated, will be explained here.

(1) The prediction device 100 obtains, from the load information DB 110, load information of a target computer to be loaded with a job J to be processed in a particular time range in a scheduled day on which the job J will be carried out. The load information of the target computer is, e.g., an average of an amount of work loaded onto the target computer (called "average amount of work" hereafter). Suppose, here, that the particular time range is a "time range from 9 to 12 o'clock". In this case, the prediction device 100 obtains, from the load information DB 110, load information indicating an average amount of work loaded onto the target computer, e.g., in the time range from 9 to 12 o'clock, Monday, May 30.

(2) The prediction device 100 selects, from among past running days, one or more days on which the target computer carried out the job J giving a sign that the load condition of the target computer in the time range from 9 to 12 o'clock is similar to the load condition of the target computer in the time range from 9 to 12 o'clock on the scheduled day.

That is, the prediction device 100 selects one or more of periods of time in which the target computer carried out the job J in the past being particularly similarly related to the load condition in the period of time in which the job J is expected to be carried out. The particularly similarly related period of time is one of the periods time in which the target computer carried out the job J in the past giving a sign that the load condition of the target computer is similar to the load condition of the target computer in the period of time in which the job J is expected to be carried out.

For example, the particularly similarly related period of time may be a period of time in which a difference between an average amount of work loaded onto the target computer in the periods of time in which the target computer carried out the job J in the past and an average amount of work loaded onto the target computer in the period of time in which the job J is expected to be carried out is not greater than a threshold value. Further, as the particularly similarly related periods of time, a plurality of periods of time may be selected, from the periods of time in which the job J is carried out in the past, in the increasing order of the absolute value of a difference between an average amount of work loaded onto the target computer in the periods of time in which the job J is carried out in the past and an average amount of work loaded onto the target computer in the period of time in which the job J is expected to be carried out.

In FIG. 1, the running days on which the target computer carried out the job J in the past are Monday, April 11; Monday, April 18; Monday, April 25; Monday, May 2; Monday, May 9; Monday, May 16; and Monday, May 23.

For example, the prediction device 100 identifies at least one of the above past running days giving a sign that an absolute difference between an average amount of work loaded onto the target computer in the time range from 9 to 12 o'clock on Monday, May 30 and an average amount of work loaded onto the target computer in the time range from 9 to 12 o'clock in the past is not greater than a threshold.

Incidentally, the average amount of work loaded onto the target computer in the time range from 9 to 12 o'clock on the scheduled day may be identified, e.g., from load information of the target computer in the time range from 9 to 12 o'clock on the scheduled day. Further, the average amount of work loaded onto the target computer in the time range from 9 to 12 o'clock on the past running days may be identified, e.g., from load information of the target computer in the time range from 9 to 12 o'clock on the past running days.

The prediction device 100 may identify a past running day giving a sign that the load condition of the target computer in the "time range from 9 to 12 o'clock" is similar to that on the scheduled day. In FIG. 1, e.g., the prediction device 100 identifies Monday, April 11; Monday, May 2; and Monday, May 16 as the running days giving a sign that the load condition of the target computer in the "time range from 9 to 12 o'clock" is similar to that on the scheduled day "Monday, May 30".

(3) The prediction device 100 calculates predicted data processing time for the job J to be carried out by the target computer to be loaded with the job J on the scheduled day, on the basis of the data processing time for the job J carried out on the identified running days. The data processing time mentioned here means, e.g., running time to be taken since the job J starts being carried out and until the job J finishes being carried out.

For example, the prediction device 100 calculates an average of the data processing time for the job J carried out on the identified running days so as to calculate predicted data processing time for the job J that is to be carried out, by the target computer to be loaded, after 12 o'clock on the scheduled day. Incidentally, the data processing time for the job J carried out on the identified running days is obtained, e.g., from the target computer to be loaded with the job J.

Suppose, e.g., that the data processing time for the job J carried out on Monday, April 11; Monday, May 2; and Monday, May 16 is "20 minutes", "15 minutes" and "25 minutes", respectively. In this case, the predicted data processing time for the job J is "20 minutes".

(4) The prediction device 100 outputs the predicted data processing time for the job J having been calculated. Here, the prediction device 100 outputs the predicted data processing time "20 minutes" in a case where the job J is carried out after 12 o'clock on Monday, May 30.

The prediction device 100 of the first embodiment explained above may calculate predicted data processing time for the job J to be carried out on the scheduled day, on the basis of the data processing time for the job J carried out on the past running days each giving a sign that the load condition of the target computer in the same time range as the time range until the scheduled day and time is similar to the load condition on the scheduled day. The prediction device 100 may thereby calculate predicted data processing time for the job in accordance with the load condition of the target computer to be loaded with the job on the scheduled day. In this way, the prediction device 100 may predict data processing time for a job according to the first embodiment more precisely than according to simple calculation of an average of data processing time for the job J in the past, etc.

Second Embodiment

Next, a scheduling system 200 of a second embodiment will be explained. The second embodiment will be explained in a case where the prediction device 100 having been explained as to the first embodiment is applied to a job management device 201 included in the scheduling system 200. Incidentally, explanation of a portion which is the same as the corresponding one explained as to the first embodiment will be omitted here.

Figure 2:
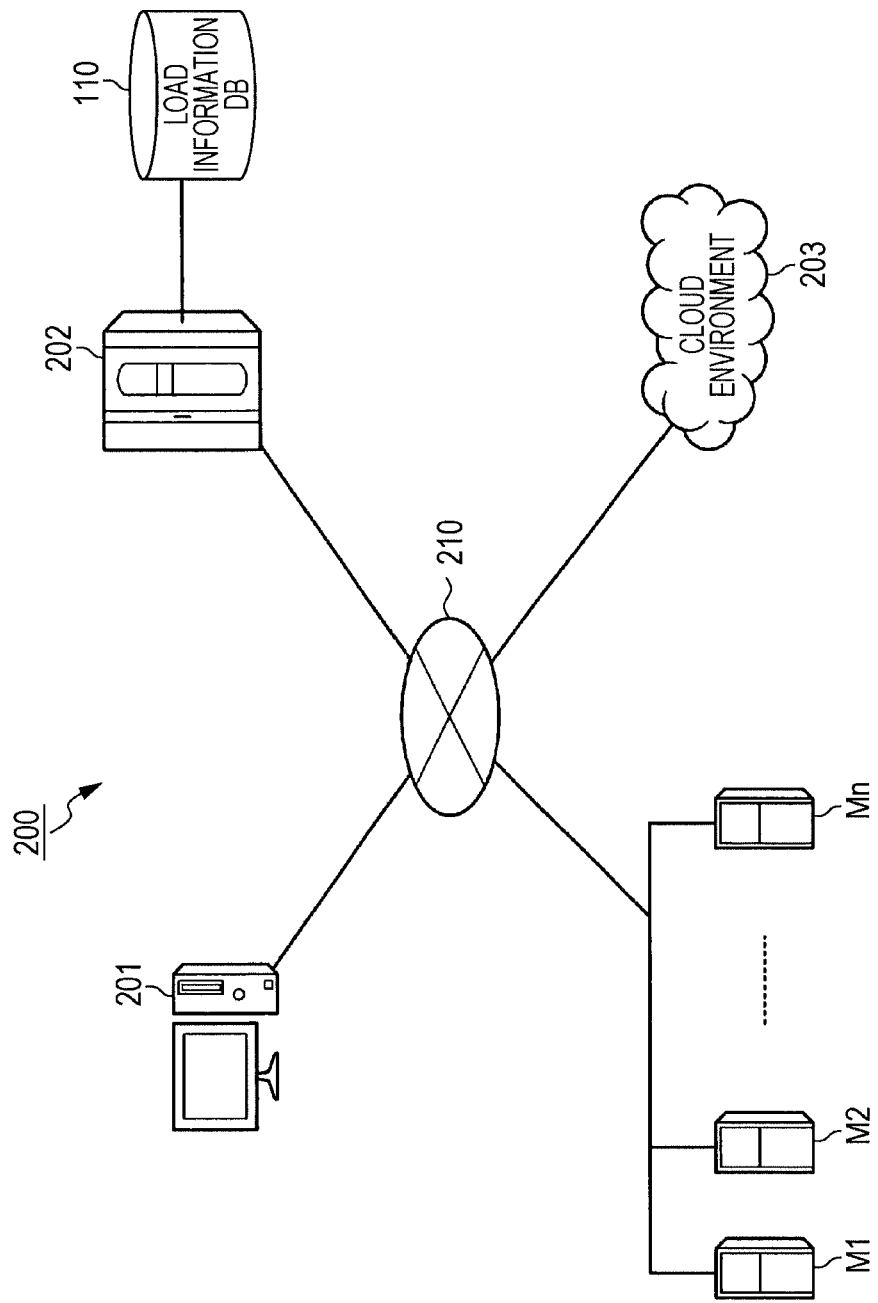
FIG. 2 is a diagram illustrating a configuration example of a scheduling system, according to an embodiment.

FIG. 2 is a diagram illustrating a configuration example of a scheduling system, according to an embodiment. The scheduling system 200 depicted in FIG. 2 may be configured to include the job management device 201, an information collecting device 202, machines M1-Mn (where n is a natural number larger than one), and a cloud environment 203. The job management device 201, the information collecting device 202, the machines M1-Mn, and the cloud environment 203 are connected to one another via a wired or wireless network 210 in the scheduling system 200. The network 210 is, e.g., the Internet, a local area network (LAN) or a wide area network (WAN).

The job management device 201 mentioned here is a computer which manages a job to be processed (hereinafter, also expressed as "a target job"). For example, the job management device 201 has functions to schedule a job, to watch how the job is run, and to power on and off the machines M1-Mn, etc. Further, the job management device 201 may access the load information DB 110 via the information collecting device 202.

The information collecting device 202 may be a computer having the load information DB 110 and a function to collect load information of the respective machines M1-Mn. The load information characterizes load condition of the respective machines M1-Mn and represents amounts of work such as amounts of use of CPUs or I/Os of the respective machines M1-Mn. The amounts of use of the CPUs mean, e.g., usage rates of the CPUs of the respective machines M1-Mn. The amounts of use of the I/Os mean, e.g., a sum of the numbers of bytes read from and written into physical disks in the machines M1-Mn.

For example, the information collecting device 202 receives, from the respective machines M1-Mn, load information collected periodically (e.g., every one minute) by means of respective agents introduced into the respective machines M1-Mn. The information collecting device 202 may thereby periodically collect the load information of the respective machines M1-Mn.

The collected load information of the respective machines M1-Mn may be stored, e.g., in the load information DB 110. Further, a lot of jobs to be processed each have a characteristic such that the job is repeatedly carried out on a particular day of every week or on a particular day of every month. Thus, the information collecting device 202 may calculate average amounts of work loaded onto the respective machines M1-Mn on a basis of particular days of the week or of the month and store the calculated average amounts of work in the load information DB 110.

Further, upon being requested by the job management device 201 an amount of work loaded onto a particular target computer at particular time, the information collecting device 202 may calculate, e.g., an average amount of work loaded onto the particular target computer at the particular time and reply to the job management device 201.

The machines M1-Mn are each a target computer which carries out a job to be processed (also expressed as "a target job"). The machines M1-Mn are each, e.g., a server in an on-premises environment, a personal computer (PC), a virtual computer which works on the server, etc. An agent which periodically collects the load information of the respective machines M1-Mn (by means of software) may be introduced into each of the machines M1-Mn.

Further, the machines M1-Mn each have a function to send the load information collected by the agent to the job management device 201. Specifically, e.g., the machines M1-Mn each send the load information each time the agent collects the load information. As a result, the job management device 201 periodically collects the load information of the respective machines M1-Mn.

The cloud environment 203 is a cloud computing system including a group of servers which each carry out a job to be processed. Specifically, e.g., the group of servers includes a Web server in a data center, an application server, a database server, etc. The information collecting device 202 may collect load information of the group of servers included in the cloud environment 203.

Incidentally, the job management device 201 and the information collecting device 202 are, although not limited to be, provided separately from each other according to the above explanation. For example, the job management device 201 may have the load information DB 110 and the function of the information collecting device 202.

(Exemplary Hardware Constitution of the Job Management Device 201)

Figure 3:
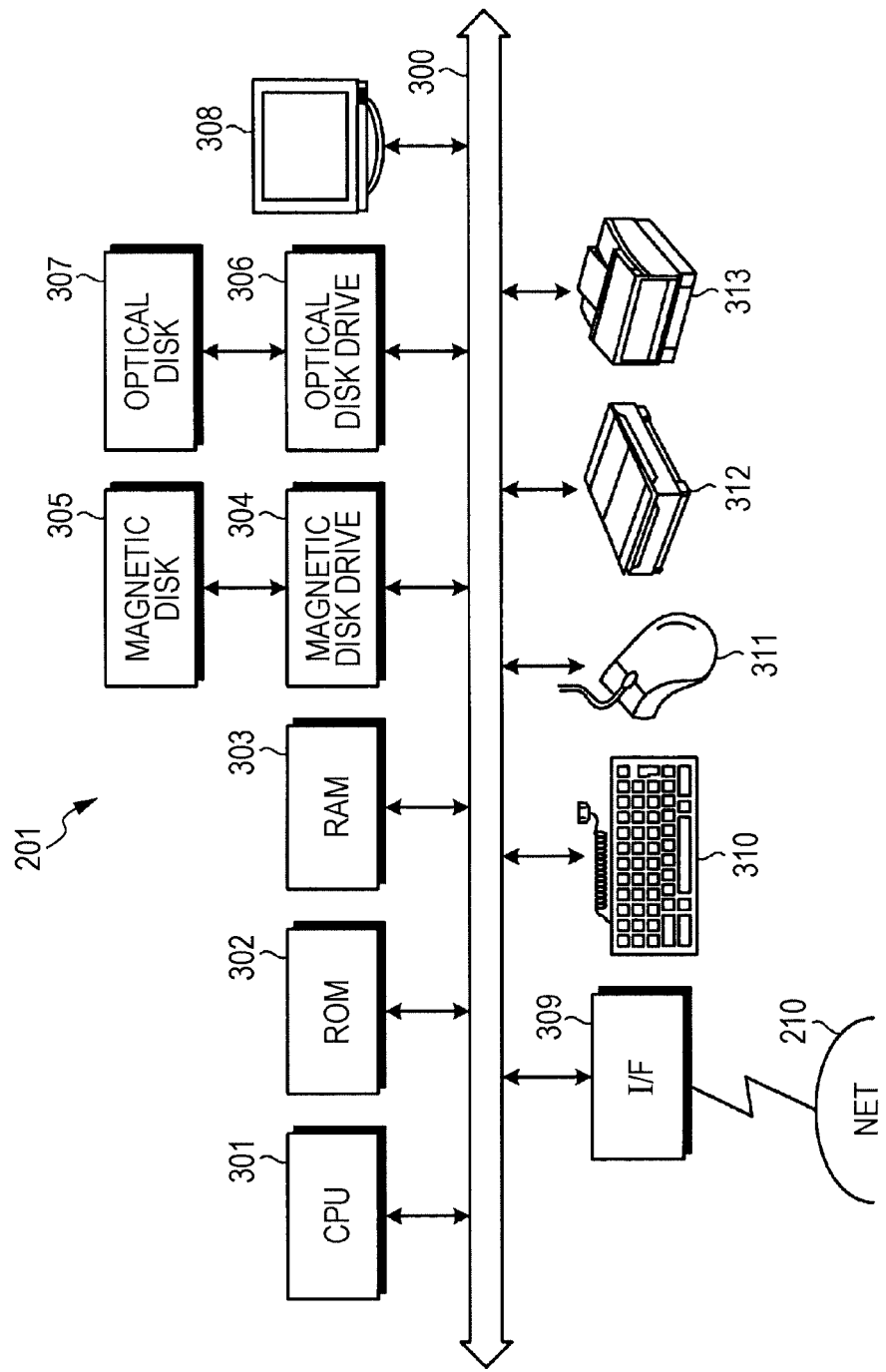
FIG. 3 is a diagram illustrating an example of a hardware configuration of a job management device, according to an embodiment.

FIG. 3 is a diagram illustrating an example of a hardware configuration of a job management device, according to an embodiment. As depicted in FIG. 3, the job management device 201 may be configured to include a CPU 301, a read-only memory (ROM) 302, a random access memory (RAM) 303, a magnetic disk drive 304, a magnetic disk 305, an optical disk drive 306, an optical disk 307, a display monitor 308, an interface (I/F) 309, a keyboard 310, a mouse 311, a scanner 312 and a printer 313. Further, the above components are connected to one another via a bus 300.

The CPU 301 entirely controls the job management device 201. The ROM 302 stores therein a program such as a boot program. The RAM 303 may be used as a work area for the CPU 301. The magnetic disk drive 304 controls operations to read and write data from and to the magnetic disk 305 as controlled by the CPU 301. The magnetic disk 305 stores therein data written as controlled by the magnetic disk drive 304.

The optical disk drive 306 controls operations to read and write data from and to the optical disk 307 as controlled by the CPU 301. The optical disk 307 stores therein data written as controlled by the optical disk drive 306, and allows a computer to read data stored in the optical disk 307.

The display monitor 308 indicates thereon a cursor, an icon and a toolbox as well as data such as a document, an image, and functional data. Monitors such as a CRT, a TFT liquid crystal display, a plasma display and so on may be employed as the display monitor 308.

The I/F 309 is connected to the network 210 via a communication line, and is connected to another device via the network 210. Then, the I/F 309 controls an interface between the network 210 and the inside, and controls data input and output from and to an external device. Devices such as a modem, a LAN adaptor and so on may be employed as the I/F 309.

The keyboard 310 has a key for operations to input a character, a numeral, various kinds of instructions, etc. and is used for data input. Further, the keyboard 310 may be replaced with a touchpad for data input or a ten key. The mouse 311 is used for operations to move the cursor, to choose an area, to move or resize a window on a screen displayed on the display monitor 308. The mouse 311 may be replaced with a trackball or a joystick having a similar function of a pointing device.

The scanner 312 optically reads an image and introduces image data into the job management device 201. Incidentally, the scanner 312 may have an optical character reader (OCR) function. Further, the printer 313 prints image or document data. A laser printer or an inkjet printer may be employed as the printer 313.

Incidentally, the job management device 201 may lack some of the portions described above such as the optical disk drive 306, the optical disk 307, the scanner 312, the printer 313, etc. Further, the information collecting device 202, the machines M1-Mn, and the group of servers included in the cloud environment 203 each may be implemented by a hardware configuration similar to that of the job management device 201 described above.

(What is Stored in a Schedule Table 400)

Next, what is stored in a schedule table 400 to be used by the job management device 201 will be explained. The schedule table 400 is implemented in a storage device such as the RAM 303, the magnetic disk 305, or the optical disk 307 as depicted in FIG. 3.

FIG. 4 is a diagram illustrating an example of what is stored in the schedule table 400, according to an embodiment. As depicted in FIG. 4, the schedule table 400 has fields of a job name, a starting day, expected starting time, expected ending time, predicted data processing time, predicted ending time, a parameter, who's loaded, a user name, and a comment. Set data in each of the fields, so that schedule information 400-1 through 400-*m* for jobs J1 through Jm, respectively, is stored as a record.

The job name represents an identifier of the job to be processed. The starting day represents a day on which the job starts to be carried out. The expected stating time is expected time (HH:MM) at which the job starts to be carried out. The expected ending time is expected time (HH:MM) at which the job finishes being carried out. The predicted data processing time represents predicted data processing time that the scheduling system 200 takes so as to carry out the job.

The predicted ending time represents predicted time (HH:MM) at which the job finishes being carried out. The parameter represents a file related to parameters that the scheduling system 200 uses so as to carry out the job. The field of who's loaded represents an identifier of a machine that the job is loaded with. The user name represents an identifier of a user who requested the job. The comment field represents a comment related to the job.

The schedule information 400-1, e.g., says that, for a job J1, "Wednesday" is set to the starting day, "10:00" to the expected starting time, "10:15" to the expected ending time, "-" to the predicted data processing time, and "-" to the predicted ending time. Further, "file data 1.dat" is set to the parameter, "root" to the user name, and "customer management" to the comment.

The starting day "Wednesday" says that the job J1 is carried out every Wednesday. The comment "customer management" says that the job J1 is related to customer management work. Further, nothing is set for the job J1 to the field of the predicted data processing time as indicated by "- (null)", nor to the fields of the predicted ending time and who's loaded.

The schedule information 400-2, e.g., says that, for a job J2, "25th" is set to the starting day, "9:00" to the expected starting time, "13:30" to the expected ending time, "-" to the predicted data processing time, and "-" to the predicted ending time. Further, "file data 2.dat" is set to the parameter, "root" to the user name, and "customer management" to the comment.

The starting day "25th" says that the job J1 is carried out every 25th day of the month. Further, nothing is set for the job J2 to the field of the predicted data processing time as indicated by "- (null)", nor to the fields of the predicted ending time and who's loaded. Incidentally, set a "date (YY:MM:DD)" to the field of the starting day in order to specify a particular date for the starting day.

Further, the schedule information 400-1 through 400-m may each include related information representing another job related to the job to be processed. The related information includes, e.g., information representing a related group of jobs or order in which the jobs in the group are carried out.

(Exemplary Functional Constitution of the Job Management Device 201)

Figure 5:
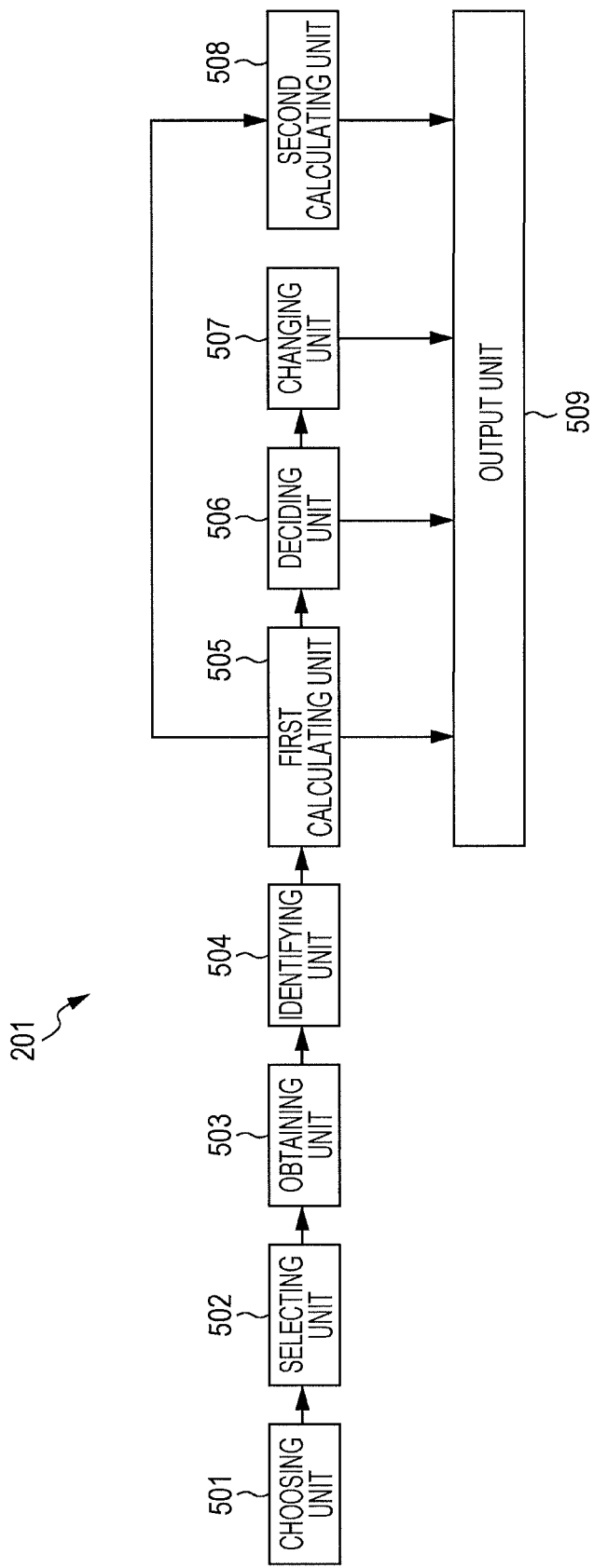
FIG. 5 is a diagram illustrating an example of a functional configuration of a job management device, according to an embodiment.

FIG. 5 is a diagram illustrating an example of a functional configuration of a job management device, according to an embodiment. As depicted in FIG. 5, the job management device 201 may be configured to include a choosing unit 501, a selecting unit 502, an obtaining unit 503, an identifying unit 504, a first calculating unit 505, a deciding unit 506, a changing unit 507, a second calculating unit 508, and an output unit 509. These functions to form a controller (the choosing unit 501 through the output unit 509) may be implemented, for example, by means of a program stored in the storage device such as the ROM 302, the RAM 303, the magnetic disk 305, or the optical disk 307 depicted in FIG. 3 and run by the CPU 301 or the I/F 309. Further, results of data processing run by the respective functional units are stored in the storage device such as the RAM 303, the magnetic disk 305, or the optical disk 307.

The choosing unit 501 has a function to choose a job to be processed. For example, the choosing unit 501 may refer to the schedule table 400 depicted in FIG. 4 so as to choose one of the jobs J1-Jm whose starting day is the present day. Further, the choosing unit 501 may choose a job specified by an input operation done by a user by the use of, e.g., the keyboard 310 or the mouse 311 depicted in FIG. 3.

The selecting unit 502 has a function to select a target computer to be loaded with a job to be processed. For example, the selecting unit 502 may select a machine to be loaded with the job to be processed, from the machines M1-Mn and the cloud environment 203 depicted in FIG. 2. A result of the selection is stored, e.g., in the schedule table 400.

When, e.g., the machine M1 is selected as the machine to be loaded with the job J1 to be processed, "M1" is set to the who's loaded field in the schedule information 400-1. At this time, data as to where a group of programs for carrying out the job J1 is filed (e.g., c:\) may be stored in the schedule information 400-1 together. Incidentally, what is specifically processed by the selecting unit 502 selecting the target computer to be loaded with the job will be described later with reference to FIG. 11.

A job to be processed (a target job) is written as a "job J" as explained below. Further, a target computer to be loaded with the job J will be written as a "machine M".

The obtaining unit 503 has a function to obtain load information indicating load condition of the machine M in a specified period of time in an expected period of time. The term period of time means each of periods of time into which the time axis is segmented by a certain time width (a certain time duration) as described above. The expected period of time means a period of time in which the job J is expected to start to be carried out. The specified period of time means one of the respective periods of time. Any one of the respective periods of time may be set as the specified period of time.

Segment the time axis, e.g., on a daily basis. Then, the expected period of time is one of days on which the job J is expected to start to be carried out (e.g., May 18, 2011). Further, the specified period of time is one of time ranges (e.g., from 9 to 12 o'clock) in the day on which the job J starts to be carried out.

Further, segment the time axis, e.g., on a weekly basis. Then, the expected period of time is one of weeks in which the job J is expected to start to be carried out (e.g., tenth week in the year 2011). Further, the specified period of time is one of days of the week in which the job J starts to be carried out or a group of consecutive days of the week (e.g., Monday-Wednesday).

The load information indicating the load condition of the machine M in the specified period of time in the expected period of time indicates, e.g., an average amount of work loaded onto the machine M in the specified period of time in the expected period of time. For example, the load information indicating the load condition of the machine M includes an average amount of use of the CPU and an average amount of use of the I/O of the machine M.

For example, the obtaining unit 503 may obtain the load information indicating an average amount of work loaded onto the machine M (e.g., average amounts of use of the CPU and the I/O) in the specified period of time in the expected period of time from the load information DB 110 via the load information DB 110.

Further, the obtaining unit 503 has a function to obtain load information indicating load condition of the machine M in a specified period of time in each of periods of time in which the machine M carried out the job J. For example, the obtaining unit 503 may obtain, from the load information DB 110 via the information collecting device 202, load information indicating an average amount of work loaded onto the machine M in a specified period of time in each of periods of time in which the machine M carried out the job J at particular time.

Any time may be set as the particular time. The particular time may be, e.g., an interval between a certain period of time (e.g., a couple of days, months or years) ago and at present. The information indicating the particular time may be stored in the storage device such as the ROM 302, the RAM 303, the magnetic disk 305, or the optical disk 307.

Each of periods of time of a certain segment length into which the time axis is segmented on a daily basis will be explained below as an example. Further, suppose that a specified period of time in each of the periods of time is a particular time range in the relevant period of time.

Further, the obtaining unit 503 has a function to obtain data processing time for the job J carried out by the machine M. For example, the obtaining unit 503 obtains data processing time for the job J from the machine M each time the machine M carries out the job J. The obtained data processing time for the job J is stored, e.g., in a data processing time table 600 depicted later in FIG. 6.

The identifying unit 504 identifies one of periods of time in which the machine M carried out the job J (called "running days" hereafter) giving a sign that the load condition of the machine M in a particular time range on each of the running days is similar to the load condition of the machine M in the relevant time range in an expected period of time (called "scheduled day" hereafter). The particular time range may be set to any time range in one day by means, e.g., of an input operation done by a user using the keyboard 310 or the mouse 311.

An exemplary case will be explained below in which a time range until present time on a scheduled day when the job J starts to be carried out (i.e., a time range until scheduled day and time) is set as the particular time range. What the identifying unit 504 specifically processes will be exemplarily explained (particular exemplary processes 1-3 described below).

Particular Exemplary Process 1

The identifying unit 504 identifies one of running days giving a sign that a difference between an average amount of work loaded onto the machine M in the time range until the scheduled day and time and an average amount of work loaded onto the machine M in the same time range as the relevant time range on each of the running days is not greater than a threshold. The identifying unit 504 identifies the average amount of work loaded onto the machine M in the time range until the scheduled day and time, e.g., from load information indicating obtained load condition in the time range until the scheduled day and time. Further, the identifying unit 504 identifies the average amount of work loaded onto the machine M in the same time range as the relevant time range on each of the running days, e.g., from obtained load information indicating the average amount of work loaded onto the machine M in the same time range as the relevant time range.

For example, the identifying unit 504 may identify one of running days on which a difference d1 between an average amount of use of the CPU of the machine M in the time range until the scheduled day and time and an average amount of use of the CPU of the machine M in the same time range as the relevant time range on each of the running days is not greater than a threshold $\alpha$.

Further, for example, the identifying unit 504 may identify one of running days on which a difference d2 between an average amount of use of the I/O of the machine M in the time range until the scheduled day and time and an average amount of use of the I/O of the machine M in the same time range as the relevant time range on each of the running days is not greater than a threshold $\beta$.

Further, for example, the identifying unit 504 may identify a running day on which the above difference d1 is not greater than the threshold $\alpha$ and the above difference d2 is not greater than the threshold $\beta$. Incidentally, the above threshold $\alpha$ is preset and stored in the storage device such as the ROM 302, the RAM 303, the magnetic disk 305, or the optical disk 307, and so is the threshold $\beta$.

Particular Exemplary Process 2

The identifying unit 504 identifies one of running days on which a difference between an average amount of work loaded onto the machine M in the time range until the scheduled day and time and an average amount of work loaded onto the machine M in the same time range as the relevant time range on each of the running days has one of smallest K values (e.g., K=5 or 10).

For example, the identifying unit 504 may identify one of running days on which a difference d1 between an average amount of use of the CPU of the machine M in the time range until the scheduled day and time and an average amount of use of the CPU of the machine M in the same time range as the relevant time range on each of the running days has one of the smallest K values.

Further, for example, the identifying unit 504 may identify one of running days on which a difference d2 between an average amount of use of the I/O of the machine M in the time range until the scheduled day and time and an average amount of use of the I/O of the machine M in the same time range as the relevant time range on each of the running days has one of the smallest K values.

Particular Exemplary Process 3

Further, the identifying unit 504 may identify one of running days on which a difference between an average amount of work loaded onto the machine M in the time range until the scheduled day and time and an average amount of work loaded onto the machine M in the same time range as the relevant time range on each of the running days is not greater than a threshold and has one of smallest K values.

For example, the identifying unit 504 may identify a running day on which the difference d1 is not greater than the threshold $\alpha$ and the difference d1 has one of the smallest K values. Further, the identifying unit 504 may identify a running day on which the difference d2 is not greater than the threshold $\beta$ and the difference d2 has one of the smallest K values.

The identified running days will be written as "running days D1-DK" (K is a natural number). Further, any one of the running days D1-DK will be written as a "running day Dk" (k=1 through k).

The first calculating unit 505 has a function to calculate predicted data processing time for the job J to be carried out after the scheduled day and time on the basis of the data processing time for the job J carried out on the identified running days D1-DK. For example, the first calculating unit 505 may calculate an average length of the data processing time for the job J carried out on the running days D1-DK as the predicted data processing time for the job J.

At this time, the first calculating unit 505 may exclude plural longest (and/or shortest) values of the data processing time for the job J carried out on the running days D1-DK. The first calculating unit 505 may thereby exclude values of the data processing time extended too long because of some failure, etc., so that the predicted data processing time for the job J does not vary widely.

Further, the first calculating unit 505 may identify a running day on which the job J was not carried out in the same time range as the time range until the scheduled day and time. Then, the first calculating unit 505 may calculate predicted data processing time for the job J to be carried out after the scheduled day and time on the basis of the data processing time for the job J carried out on the identified running day.

The first calculating unit 505 may thereby calculate predicted data processing time for the job J on the basis of data processing time for the job J carried out on a running day on which load condition while the job J is not being carried out is similar to the load condition on the scheduled day. The data processing time for the job J may thereby be predicted more precisely.

Further, when the job J was carried out plural times on the running day Dk, an average length of the data processing time for the job J carried out on the running day Dk may be given as the data processing time for the job J carried out on the running day Dk. The data processing time for the job J carried out on each of the running days D1-DK may be identified, e.g., on a data processing time table 600 depicted in FIG. 6.

What is stored in the data processing time table 600 will be explained with reference to an exemplary job J1 carried out by the machine M1 in the past. Incidentally, the data processing time table 600 is made for every job J carried out by each of the machines M, and is implemented by the storage device such as the RAM 303, the magnetic disk 305, or the optical disk 307.

Figure 6:
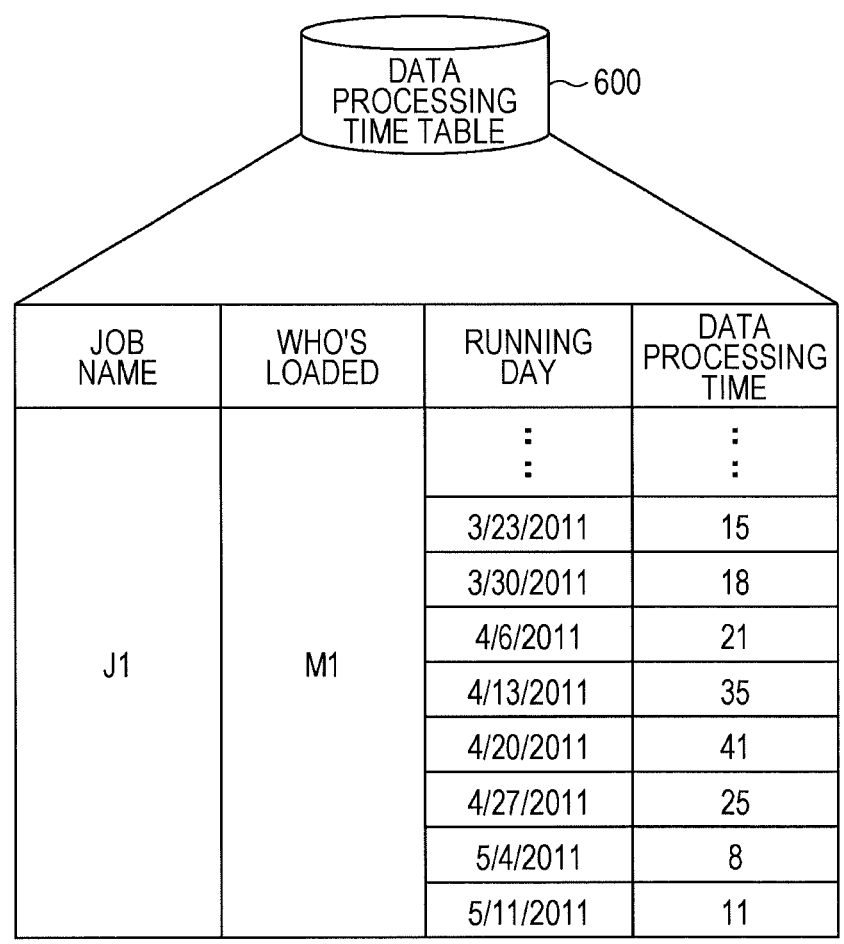
FIG. 6 is a diagram illustrating an example of what is stored in a data processing time table, according to an embodiment.

FIG. 6 is a diagram illustrating an example of what is stored in a data processing time table, according to an embodiment. As depicted in FIG. 6, the data processing time table 600 may be configured to include job name, who's loaded, running day, and data processing time fields. Set data to the respective fields, so that the data processing time for the job J1 carried out by the machine M1 is stored.

The job name field includes an identifier of a job J to be processed. The who's loaded field includes an identifier of the machine M to be loaded with the job. The running day field includes a date on which the job J was carried out. The data processing time field includes data processing time [in minutes] for the job J carried out by the machine M in the past. The data processing time for the job J1 carried out by the machine M1 on Mar. 23, 2011, e.g., is fifteen [minutes].

Name, e.g., the job J to be processed and the machine M to be loaded with the job J "job J1" and "machine M1", respectively. Further, let the identified running days D1-DK be running days D1 "Mar. 23, 2011", D2 "Apr. 6, 2011", D3 "Apr. 20, 2011", and D4 "May 11, 2011".

In this case, the first calculating unit 505 refers to the data processing time table 600 at first, so as to identify the data processing time "15 [minutes], 21 [minutes], 41 [minutes] and 11 [minutes]" for the job J1 carried out by the machine M1 on the running days D1-D4, respectively. Then, the first calculating unit 505 calculates an average of the data processing time "15 [minutes], 21 [minutes], 41 [minutes] and 11 [minutes]" for the identified job J1, so as to calculate predicted data processing time "22 [minutes]" for the job J1.

Further, the running days D1-DK identified on the basis of the amount of use of the CPU of the machine M may differ from the running days D1-DK identified on the basis of the amount of use of the I/O of the machine M in some cases in the identifying process run by the identifying unit 504 described above. When that is the case, calculate the predicted data processing time for the job J, e.g., as follows.

For example, the first calculating unit 505 calculates the predicted data processing time P1 for the job J to be carried out by the machine M after the scheduled day and time on the basis of the data processing time for the job carried out on the running days D1-DK identified on the basis of the amount of use of the CPU of the machine M. Further, the first calculating unit 505 calculates the predicted data processing time P2 for the job J to be carried out by the machine M after the scheduled day and time on the basis of the data processing time for the job J carried out on the running days D1-DK identified on the basis of the amount of use of the I/O of the machine M. Then, the first calculating unit 505 may choose the calculated predicted data processing time of a longer time length, either P1 or P2, as the predicted data processing time for the job J.

A result of the calculation is stored, e.g., in the schedule table 400. When, e.g., predicted data processing time "22 [minutes]" for the job J1 is calculated, set "22" to the predicted data processing time field in the schedule information 400-1. Further, e.g., set "10:22" to the predicted ending time field in the schedule information 400-1 so as to indicate time after the expected starting time of the job J1 by the predicted data processing time.

The data processing time for the job J carried out on the respective running days D1-DK is identified from, although not limited to, the data processing time table 600 as explained above. The first calculating unit 505 may, e.g., directly ask the machine M and identify the processing time for the job J carried out on the respective running days D1-DK.

Further, the job management device 201 identifies running days D1-DK giving a sign that the load condition of the machine M is similar to the load condition until the scheduled day and time, although not limited to, by itself. The job management device 201 may, e.g., ask the information collecting device 202 and identify the running days D1-DK giving a sign that the load condition of the machine M is similar to the load condition until the scheduled day and time.

Return to FIG. 5 for continued explanation. The output unit 509 has a function to output the calculated predicted data processing time for the job J to be carried out by the machine M after the scheduled day and time. For example, the output unit 509 may output schedule information related to the job to be processed in the schedule table 400. Exemplary schedule information to be outputted will be explained.

Figure 7:
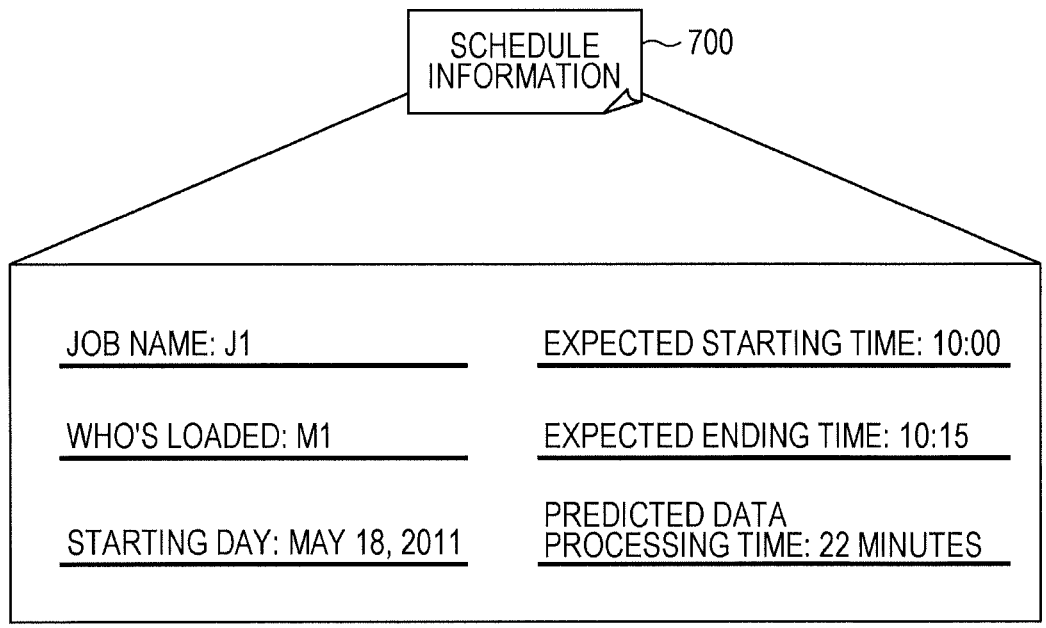
FIG. 7 is a diagram illustrating an example of schedule information, according to an embodiment.

FIG. 7 is a diagram illustrating an example of schedule information, according to an embodiment. As depicted in FIG. 7, schedule information 700 includes a job name of the job J1 to be processed, a machine name of the machine M1 to be loaded, a starting day, expected starting time, expected ending time, and predicted data processing time, related to one another.

A user may identify expected starting time, expected ending time, and predicted data processing time for the job J1 which starts to be carried out on a starting day "May 18, 2011", which are "10:00", "10:15" and "22 minutes", respectively, according to the schedule information 700. Further, the user may be aware that the time "10:22" after the expected starting time of the job J1 by the predicted data processing time is over the expected ending time of the job J1. The user may thereby take action such as to change the expected starting time of the job J1 in order that the job J1 finishes being carried out before the expected ending time.

Incidentally, the output unit 509 may output the predicted data processing time by indicating the output on the display monitor 308, printing out the output through the printer 313, and by sending the output to an external computer through the I/F 309. Further, the output may be stored in a storage area in the RAM 303, the magnetic disk 305, the optical disk 307, etc.

Return to FIG. 5 for continued explanation. The deciding unit 506 has a function to decide whether the predicted ending time, i.e., after the expected starting time of the job J by the calculated predicted data processing time for the job J is over the expected ending time of the job J. The expected starting time and the expected ending time of the job J may be identified, e.g., from the schedule table 400.

Let, e.g., the predicted data processing time for the job J1 to be processed be "22 minutes". In this case, the predicted ending time, i.e., after the expected starting time "10:00" by the predicted data processing time "22 minutes" is "10:22". In this case, the deciding unit 506 decides that the predicted ending time "10:22" is over the expected ending time "10:15" of the job J1.

Further, the output unit 509 has a function to output a result of the decision having been made. For example, when the predicted ending time of the job J is over the expected ending time, the output unit 509 may output warning information indicating that the predicted ending time of the job J is over the expected ending time. An example of the warning information will be explained.

Figure 8:
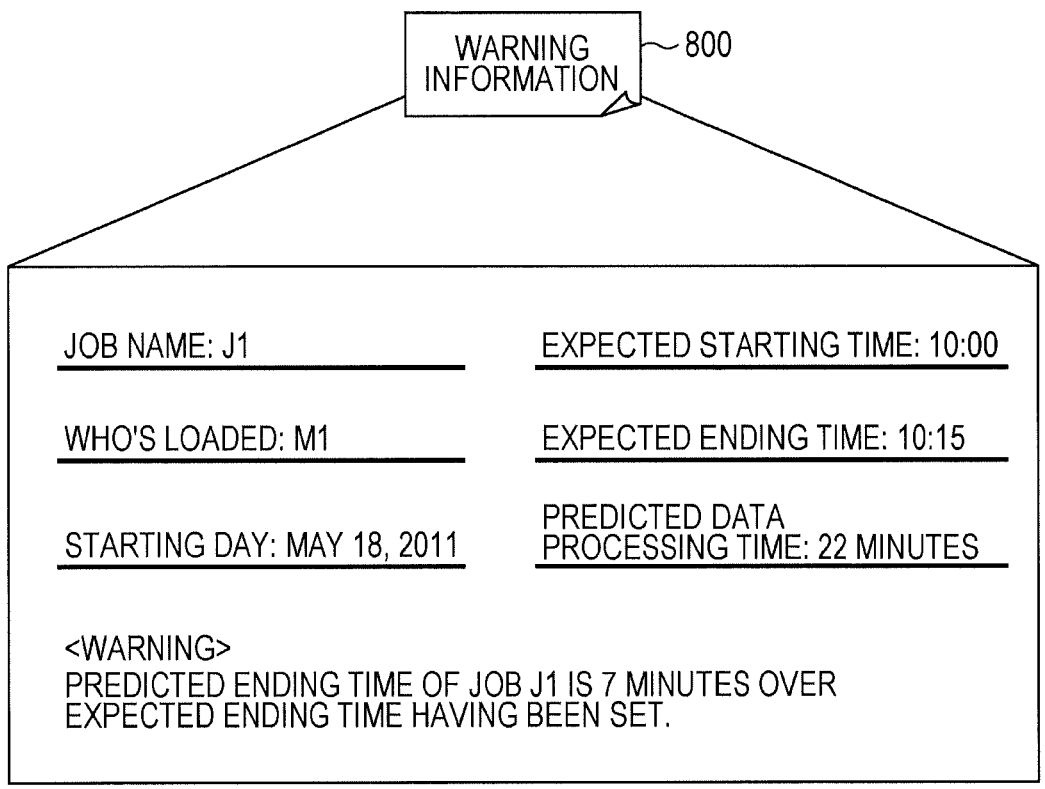
FIG. 8 is a diagram illustrating an example of warning information, according to an embodiment.

FIG. 8 is a diagram illustrating an example of warning information, according to an embodiment. As depicted in FIG. 8, warning information 800 indicates that the predicted ending time of the job J1 to be processed is over the expected ending time. Specifically, e.g., the warning information 800 includes a job name of the job J1, a machine name of the machine M1 to be loaded, a starting day, expected starting time, expected ending time, and predicted data processing time, related to one another. Further, the warning information 800 includes warning text indicating that the predicted ending time of the job J1 is over the preset expected ending time by seven minutes.

According to the warning information 800, the user may identify the expected starting time "10:00", expected ending time "10:15", and predicted data processing time "22 minutes" for the job J1 which starts to be carried out on the starting day, May 18, 2011. Further, the user may be aware that the predicted ending time of the job J1 is over the expected ending time by seven minutes. The user may thereby take action such as to change the expected staring time of the job J1 in order that the job J1 finishes being carried out before the expected ending time.

Return to FIG. 5 for continued explanation. The changing unit 507 has a function to change the expected starting time of the job J in order that the predicted ending time of the job J is not over the expected ending time if the predicted ending time of the job J1 were over the expected ending time without the change. For example, the changing unit 507 changes and brings forward the expected starting time of the job J by a time length by which the predicted ending time were over the expected ending time.

Further, the changing unit 507 may change the expected starting time of the job J in order that the predicted ending time is not over the expected ending time and that the time range in which the job J is carried out does not overlap a time range in which another job is carried out. Incidentally, what is specifically processed by the changing unit 507 will be described later by the use of FIGS. 12-14.

As exemplarily described above, the predicted ending time of the job J1 is over the expected ending time by seven minutes. In this case, e.g., the changing unit 507 brings forward and changes the expected starting time of the job J1 by seven minutes to "9:53". A result of the change is stored, e.g., in the schedule table 400.

An exemplary transition in what is stored in the schedule table 400 will be explained in an exemplary case where the expected starting time of the job J1 is changed.

Figure 9:
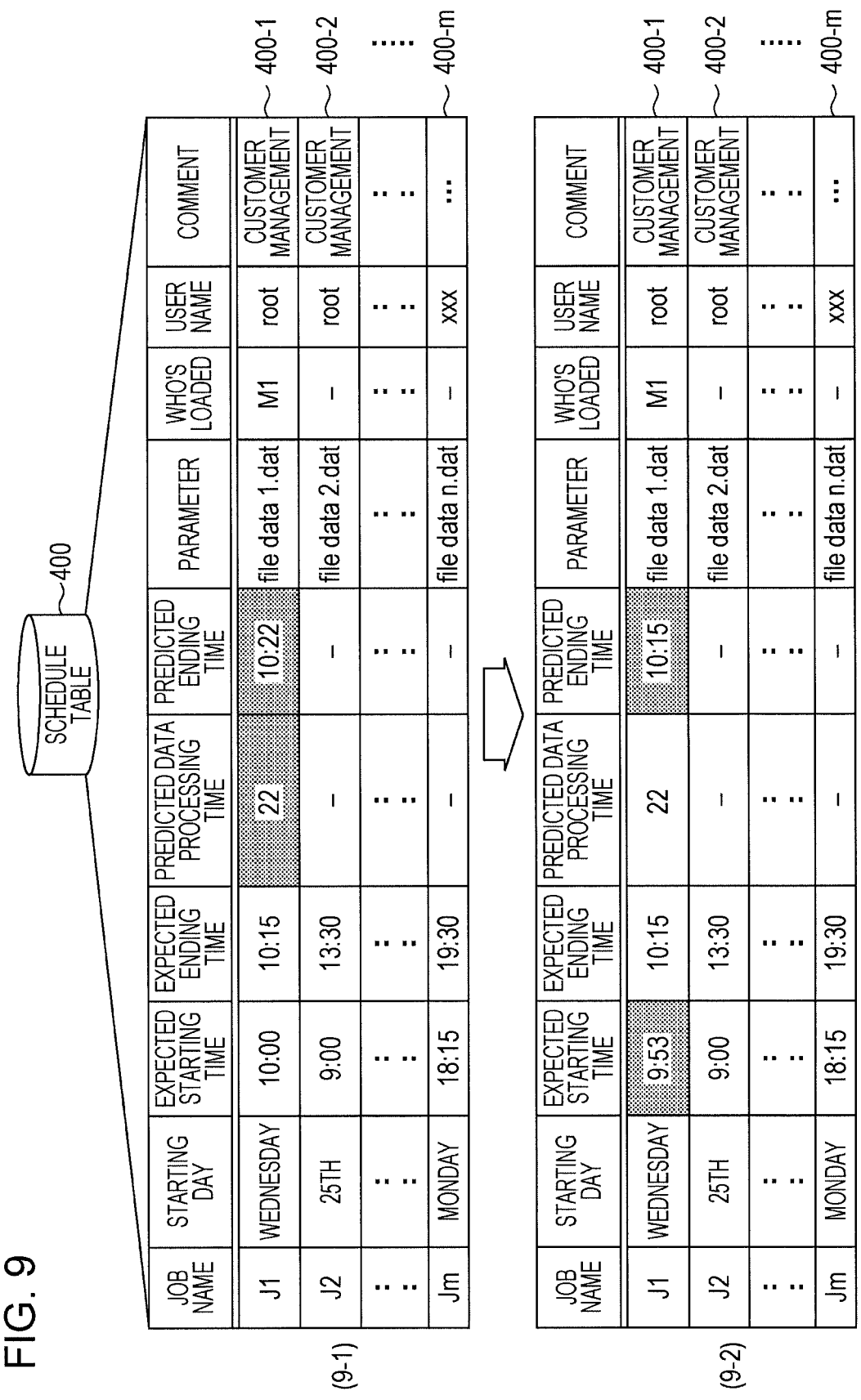
FIG. 9 is a diagram illustrating an example of transition in what is stored in a schedule table, according to an embodiment.

FIG. 9 is a diagram illustrating an example of transition in what is stored in a schedule table, according to an embodiment. A table (9-1) depicted in FIG. 9 includes schedule information 400-1 in the schedule table 400 indicating the predicted processing time "22 minutes" and the predicted ending time "10:22" both predicted in a case where the machine M1 to be loaded carries out the job J1 to be processed.

In this case, the predicted ending time of the job J1 is over the expected ending time by seven minutes as described above. Thus, the changing unit 507 brings forward and changes the expected starting time of the job J1 by seven minutes to "9:53". As a result, the expected starting time of the job J1 is brought forward by seven minutes and changed from the former "10:00" to "9:53" on a table (9-2) depicted in FIG. 9. Further, the predicted ending time of the job J1 is brought forward by seven minutes and changed from the former "10:22" to "10:15".

Return to FIG. 5 for continued explanation. The output unit 509 has a function to output the expected starting time of the job J having been changed. For example, the output unit 509 may output schedule information in which the expected starting time of the job J having been changed (e.g., schedule information 400-1 depicted in (9-2) in FIG. 9) is set.

The user may thereby be aware of the expected starting time of the job J arranged in order that the predicted ending time of the job J is not over the expected ending time. Further, e.g. upon providing an existing scheduler with the expected starting time of the job J having been changed, the user may schedule the job J to finish being carried out before the expected ending time.

Further, when the predicted ending time of the job J is over the expected ending time, the changing unit 507 may decide whether the expected starting time may be brought forward. For example, the changing unit 507 decides whether the expected starting time of the job J brought forward by a time length by which the predicted ending time was over the expected ending time is at least after the present time.

When the expected starting time is after the present time, the changing unit 507 decides that the changing unit 507 may bring forward the expected starting time of the job J. Then, the changing unit 507 changes the expected starting time of the job J so that the predicted ending time of the job J is not over the expected ending time.

Meanwhile, when the expected starting time is before the present time, the changing unit 507 decides that the changing unit 507 may hardly bring forward the expected starting time of the job J. In this case, the output unit 509 may output warning information indicating that the predicted ending time of the job J is over the expected ending time (e.g., warning information 800 depicted in FIG. 8).

The second calculating unit 508 has a function to calculate a progress value indicating to what extent the job J has progressed on the basis of the time when the job J started being carried out on that day, the present time, and the predicted processing time for the job J. For example, the second calculating unit 508 may calculate a progress percentage indicating to what extent the job J has progressed by using an equation (1) described below, where a variable F indicates the progress percentage of the job J. A variable P indicates the predicted processing time for the job J in minutes. A variable p indicates an interval between the time when the job J started and the present time in minutes.

$$F=(p/P)\times 100 \qquad (1)$$

Let, e.g., the time when the job J1 started be "9:53", the present time "10:00", and the predicted processing time "P=22 [minutes]". In this case, the interval between the time when the job J started and the present time is "p=7 [minutes]". Thus, the progress percentage F of the job J1 is "F=32 [%]= (7/22)×100".

Further, the output unit 509 has a function to output a progress degree indicating to what extent the job J has progressed as calculated. For example, the output unit 509 may present a progress status screen 1000 on the display monitor 308. Then, an example of the progress status screen 1000 will be explained.

(Exemplary Progress Status Screen)

Figure 10:
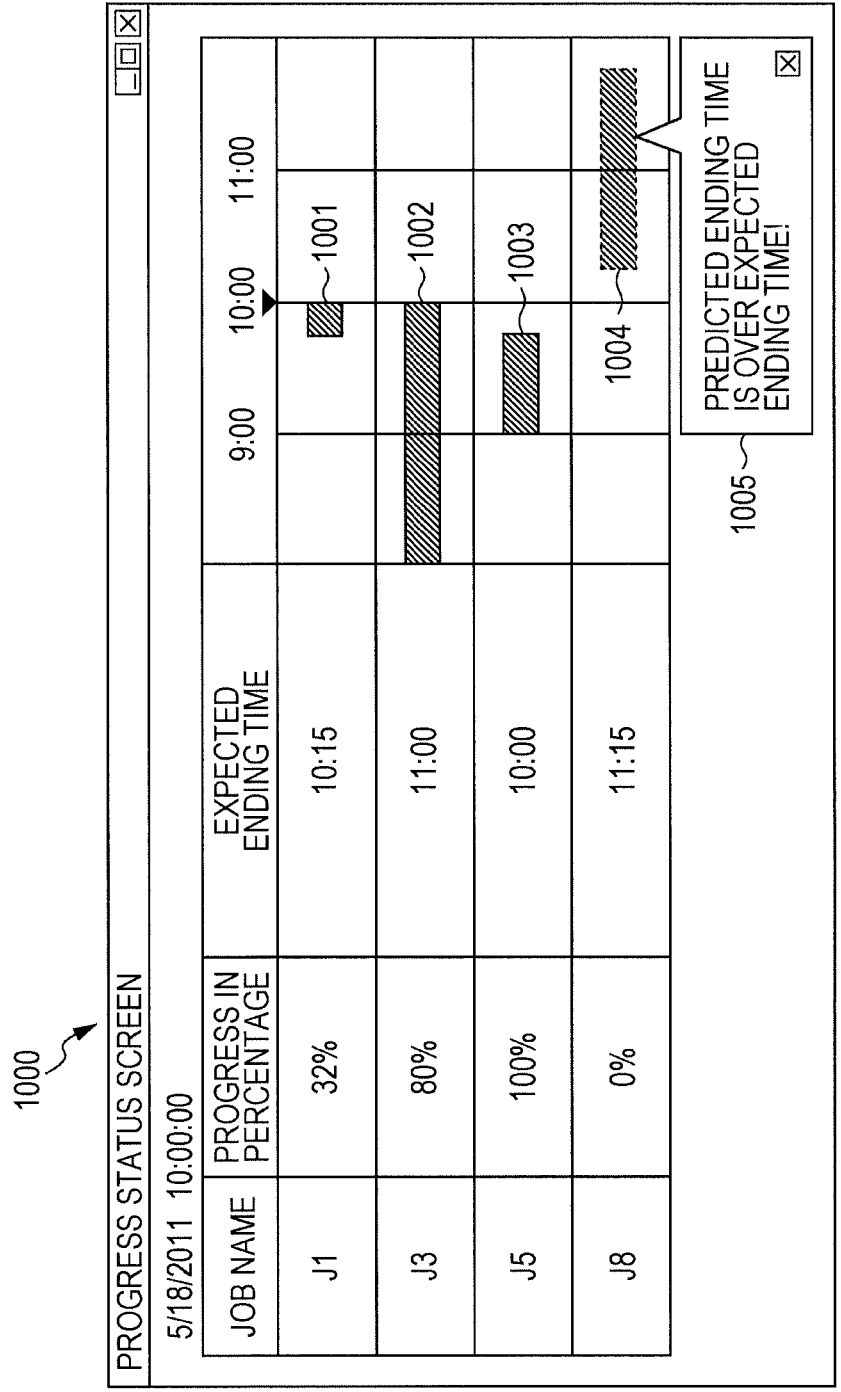
FIG. 10 is a diagram illustrating an example of a progress status screen, according to an embodiment.

FIG. 10 is a diagram illustrating an example of a progress status screen, according to an embodiment. FIG. 10 depicts a progress status screen 1000 indicating progress status of the job J to be processed. For example, the progress status screen 1000 includes job names, progress percentages, expected ending time, and Gantt charts indicating progress status of respective jobs J1, J3, J5, and J8.

The progress status screen 1000 indicates, e.g., a progress percentage "32%" and expected ending time "10:15" of the job J1, and a Gantt chart 1001 indicating the progress status of the job J1. The user may be aware of the progress percentage "32%" of the job J1 at the present time "10:00" according to such information.

Further, the progress status screen 1000 indicates a progress percentage "80%" and expected ending time "11:00" of the job J3, and a Gantt chart 1002 indicating the progress status of the job J3. The user may be aware of the progress percentage "80%" of the job J3 at the present time "10:00" according to such information.

Further, the progress status screen 1000 indicates a progress percentage "100%" and expected ending time "10:00" of the job J5, and a Gantt chart 1003 indicating the progress status of the job J5. The user may be aware that the job J5 finished being carried out sooner than expected at the present time "10:00" according to such information.

Further, the progress status screen 1000 indicates a progress percentage "0%" and expected ending time "11:15" of the job J8, a Gantt chart 1004 indicating the progress status of the job J8, and a piece of warning information 1005. The job J8 has not started to be carried out at the present time "10:00". The warning information 1005 indicates that predicted ending time of the job J8 is over its expected ending time.

According to the Gantt chart 1004 and the warning information 1005, the user may intuitively know that the job J8 will not finish being carried out before the expected ending time. Thus, the user may take action such as to change expected starting time of the job J8 so that the job J8 will finish being carried out before the expected ending time.

(What is Specifically Processed by the Selecting Unit 502)

Then, an example of what is specifically processed by the selecting unit 502 which selects the machine M to be loaded with the job J to be processed will be explained. The machines M1-Mn and the cloud environment 203 depicted in FIG. 2 will be exemplarily explained as a group of machines to be conceivably loaded with the job J.

To begin with, the selecting unit 502 chooses one of the machines M1-Mn and the cloud environment 203 (called "candidate machine" hereafter). For example, the selecting unit 502 refers to priorities set to the respective machines and chooses a candidate machine of a high priority from the machines M1-Mn and the cloud environment 203.

The priorities mentioned here indicate order in which the selecting unit 502 chooses a candidate machine from members of the group of machines to be conceivably loaded. The user may set the priorities at will, e.g., through input operations done on a setting screen 1100 depicted later in FIG. 11.

Then, the selecting unit 502 obtains an amount of work loaded onto the chosen candidate machine in the past. The amount of work loaded onto the candidate machine is, e.g., an average amount of use of the CPU or I/O of the candidate machine at particular time (e.g., a couple of years or months in the past).

For example, when the job J to be processed is carried out every Monday, the selecting unit 502 obtains an average amount of work loaded onto the candidate machine every Monday at the particular time from the information collecting device 202. Further, when the job J to be processed is carried out on 25th every month, the selecting unit 502 obtains an average amount of work loaded onto the candidate machine on 25th every month at the particular time from the information collecting device 202.

Then, the selecting unit 502 decides whether the obtained amount of work loaded onto the candidate machine is not smaller than a threshold of the amount of work set to the candidate machine. The threshold of the amount of work is a criterion for deciding whether the candidate machine is employed as the machine M to be loaded with the job J. The average amount of use of the CPU or I/O of each of the machines, e.g., may be set as the threshold of the amount of work of the candidate machine.

For example, the threshold of the amount of work may be set in such a way that the candidate machine is loaded too much and the processing time for the job J is extended upon the amount of work loaded onto the candidate machine being over the threshold. The user may set the threshold of the amount of work to each of the machines at will, e.g., through input operations done on a setting screen 1100 depicted later in FIG. 11.

When the amount of work loaded onto the candidate machine is smaller than the threshold, the selecting unit 502 selects the chosen candidate machine as the machine M to be loaded with the job J to be processed. Meanwhile, when the amount of work loaded onto the candidate machine is not smaller than the threshold, the selecting unit 502 chooses one of the machines M1-Mn and the cloud environment 203 having a high priority and not having been chosen, and repeats the consecutive process described above.

An example of the setting screen 1100 that is displayed on the display monitor 308 when setting the priority and the threshold of the amount of work of each of the machines will be explained. An exemplary case where the machine M to be loaded with the job J is selected from the machines M1-M4 and the cloud environment 203 will be explained.

Figure 11:
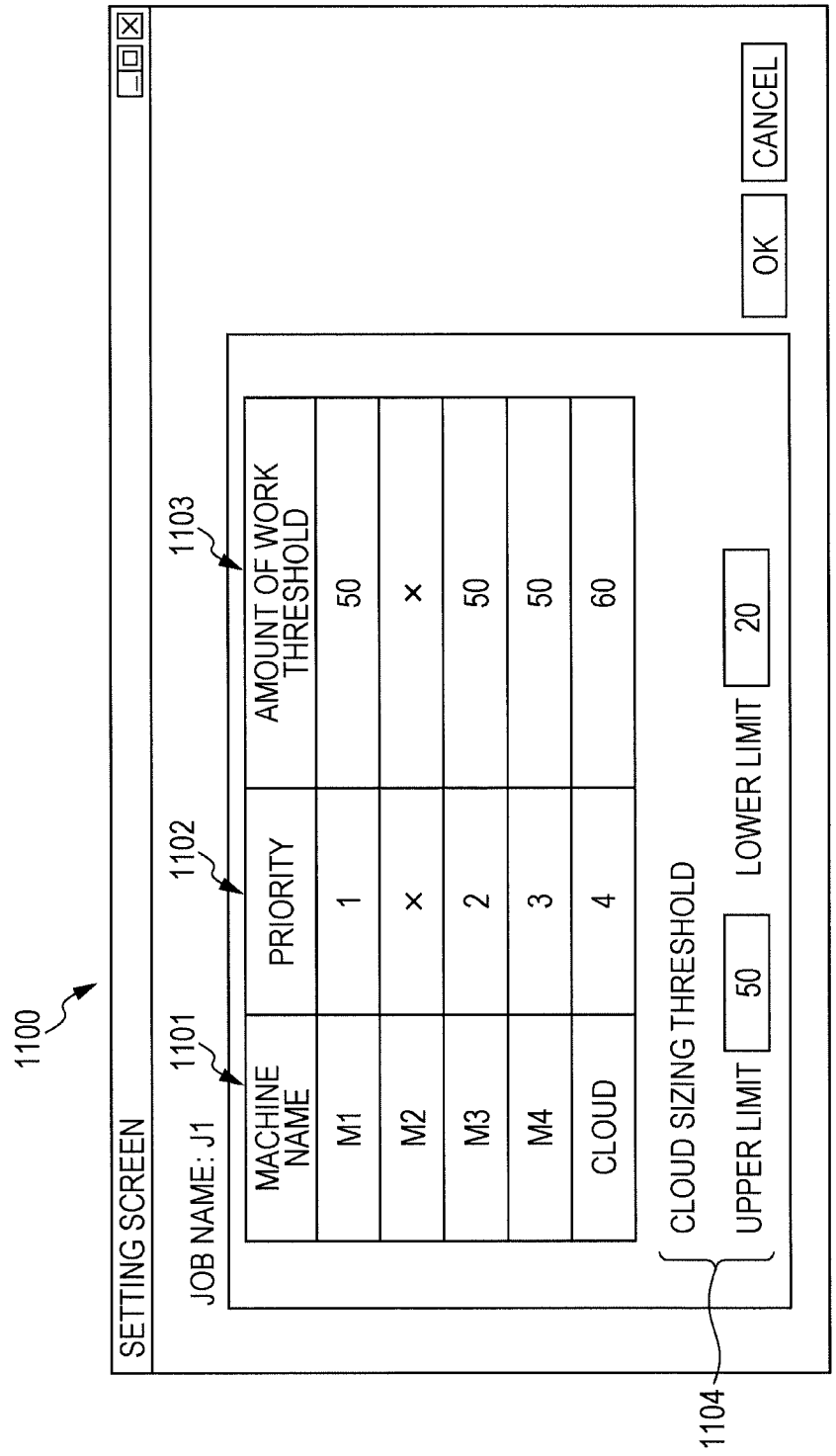
FIG. 11 is a diagram illustrating an example of a setting screen, according to an embodiment.

FIG. 11 is a diagram illustrating an example of a setting screen, according to an embodiment. FIG. 11 depicts a setting screen 1100 on which the priority and the threshold of the amount of work loaded, for each of members of the group of the machines to be conceivably loaded, are set, and so is a cloud sizing threshold of the cloud environment 203.

The setting screen 1100 includes a machine name field (column 1101 in FIG. 11) representing an identifier of the machine to be conceivably loaded with the job J1 to be processed. Incidentally, "cloud" is set in the setting screen 1100 as a machine name representing the cloud environment 203.

The setting screen 1100 includes a priority field (column 1102 in FIG. 11) representing order in which the candidate machine is chosen from the group of the machines to be conceivably loaded as described above. Let the priority be higher as it is indicated by a smaller number. Further, a symbol "x" is set to the priority of a particular machine to be excluded from the members that may be chosen.

The setting screen 1100 includes a field of the threshold of the amount of work (column 1103 in FIG. 11) representing a criterion for deciding whether the candidate machine is employed as the machine M to be loaded with the job J as described above. An upper limit of an average amount of use of the CPU of each of the machines is set to the threshold of the amount of work in FIG. 11.

The cloud sizing threshold (area 1104 in FIG. 11) is a threshold of an amount of work loaded onto the cloud environment 203 representing a criterion for deciding whether the cloud environment 203 is sized. An average amount of use of CPUs or I/Os of members of a group of servers included in the cloud environment 203, e.g., is set to the threshold of the amount of work.

Upper and lower limits of the average amount of use of the CPUs of the members of the group of servers included in the cloud environment 203 are set to the clod sizing threshold in FIG. 11. When the amount of work loaded onto the cloud environment 203 is greater than the upper limit, e.g., increase processing capability of the cloud environment 203. Meanwhile, when the amount of work loaded onto the cloud environment 203 is smaller than the lower limit, decrease the processing capability of the cloud environment 203.

The user may set various kinds of values on the setting screen 1100 by using the keyboard 310 or the mouse 311. In FIG. 11, e.g., values "1" and "50" are set to the priority of the machine M1 and the threshold of the amount of work loaded onto the machine M1, respectively. Further, the symbol "×" is set to the priority of the machine M2, and to the threshold of the amount of work loaded onto the machine M2.

Further, values "2" and "50" are set to the priority of the machine M3 and the threshold of the amount of work loaded onto the machine M3, respectively. Further, values "3" and "50" are set to the priority of the machine M4 and the threshold of the amount of work loaded onto the machine M4, respectively.

Further, values "4" and "60" are set to the priority of the cloud environment 203 and the threshold of the amount of work loaded onto the cloud environment 203, respectively. Further, values "50" and "20" are set to the upper and lower limits of the cloud sizing threshold, respectively.

Incidentally, although the average amount of use of the CPU is used as the threshold of each of the amounts of work, what is used as the threshold is not limited to the above. An average amount of use of the I/O, e.g., may be used as the threshold of each of the amounts of work, and so may both the average amounts of use of the CPU and of the I/O.

In FIG. 11, e.g., the selecting unit 502 chooses the machine M1 of the highest priority as the candidate machine from the machine M1-M4 and the cloud environment 203 at first. Then, the selecting unit 502 obtains the average amount of use of the CPU of the chosen machine M1. The job J1 is carried out every Wednesday.

Thus, the selecting unit 502 obtains an average amount of use of the CPU of the machine M1 on every Wednesday at particular time from the information collecting device 202. Then, the selecting unit 502 decides whether the obtained average amount of use of the CPU of the machine M1 is not smaller than the threshold of the amount of work "50" set to the machine M1.

When the average amount of use of the CPU of the machine M1 is smaller than the threshold, the selecting unit 502 selects the chosen machine M1 as the machine M to be loaded with the job J to be processed. Meanwhile, when the average amount of use of the CPU of the machine M1 is not smaller than the threshold, the selecting unit 502 chooses a machine M3 having a high priority and not having been chosen from the machines M1-Mn and the cloud environment 203, and repeats the consecutive process described above.

The selecting unit 502 may thereby choose a machine M to be loaded with an amount of work being smaller than the preset threshold of the amount of work as the machine to be loaded with the job J to be processed. The job management device 201 may thereby avoid a situation in which the job J is allotted to the machine M to be loaded resulting in that the machine M is loaded too much and that the data processing time for the job J is extended.

Incidentally, how the cloud environment 203 is sized on the basis of the cloud sizing threshold will be described later by the use of a flowchart depicted in FIG. 19.

(What is Specifically Processed by the Changing Unit 507)

Then, an example of what is specifically processed by the changing unit 507 which changes the expected starting time of the job J to be carried out by the machine M in order that the predicted ending time of the job J is not over the expected ending time will be explained by the use of FIGS. 12-14.

Figure 12:
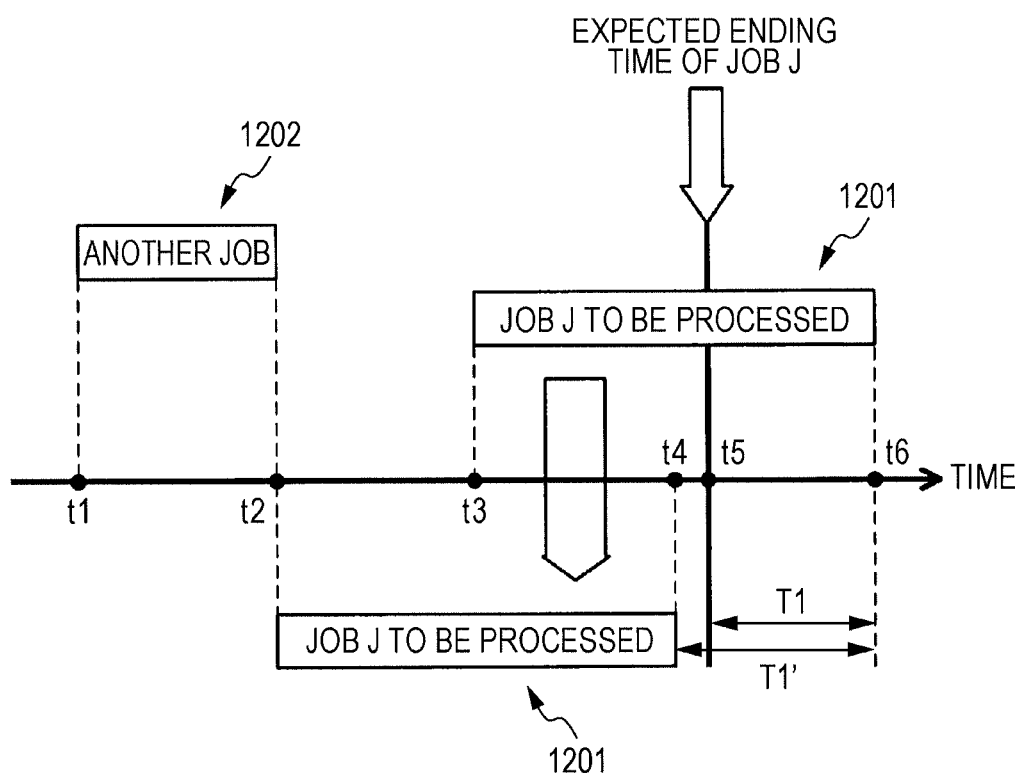
FIG. 12 is a schematic diagram illustrating an example of a change in expected starting time of a job, according to an embodiment.

FIG. 12 is a schematic diagram illustrating an example of a change in the expected starting time of the job J, according to an embodiment. FIG. 12 depicts a Gantt chart 1201 indicating a time range in which the job J to be processed is carried out by the machine M. Further, a Gantt chart 1202 indicates a time range in which another job different from the job J to be processed is carried out by the machine M.

In FIG. 12, time t1 is expected starting time of the different job, and time t2 is expected (or predicted) ending time of the different job. Further, time t3 is expected starting time of the job J to be processed. Time t6 is predicted ending time of the job J to be processed. Time t5 is expected ending time of the job J to be processed.

The predicted ending time of the job J is over the expected ending time t5 in FIG. 12. The changing unit 507 changes the expected starting time of the job J so that an overlap degree between the job J and other jobs remains not so big and that the predicted ending time of the job J is not over the expected ending time t5.

For example, the changing unit 507 brings forward and changes the expected starting time of the job J by at least T1 (in minutes), i.e., an interval between the expected ending time t5 and the predicted ending time t6 of the job J in order that the overlap degree between the job J and the other jobs remains not so big. Incidentally, the overlap degree means the number of jobs to be carried out in time ranges overlapping one another.

In FIG. 12, e.g., the expected starting time is brought forward by an interval T1' (T1'>T1) and changed to time t2, i.e., expected ending time of the different job. In this case, predicted ending time t4 of the job J is not over the expected ending time t5 of the job J. Further, the overlap degree is zero as the time ranges in which the job J and the different job are carried out do not overlap each other.

The job management device 201 may change the expected starting time of the job J in such a way that the overlap degree with other jobs remains not so big and that the predicted ending time of the job J is not over the expected ending time as described above, so that the machine M can carry out the group of the jobs (job J and other jobs) efficiently.

Figure 13:
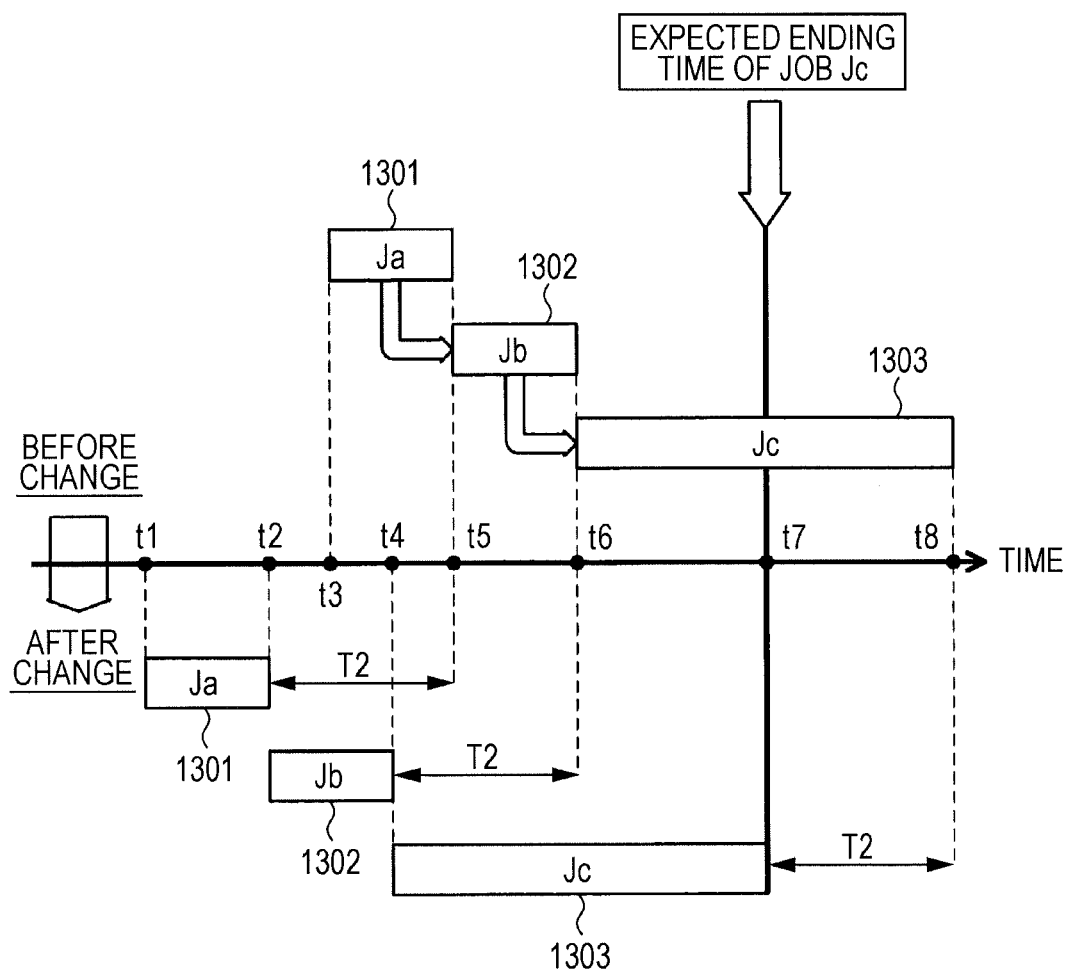
FIG. 13 is a schematic diagram illustrating an example of a change in expected starting time of a job, according to an embodiment.

FIG. 13 is a schematic diagram illustrating an example of a change in the expected starting time of the job J, according to an embodiment. FIG. 13 depicts a Gantt chart 1301 indicating a time range in which the machine M carries out a job Ja. A Gantt chart 1302 indicates a time range in which the machine M carries out a job Jb. A Gantt chart 1303 indicates a time range in which the machine M carries out a job Jc.

The job Jc is a job whose expected starting time is to be changed. Further, the jobs Ja, Jb, and Jc are arranged in order for being carried out in such a way that the job Jb starts to be carried out after the job Ja finishes being carried out, and that the job Jc starts to be carried out after the job Jb finishes being carried out.

Before the expected starting time of the job Jc to be processed is changed as depicted on the upper side in FIG. 13, time t3 is expected starting time of the job Ja, and time t5 is expected (or predicted) ending time of the job Ja. Further, the time t5 is expected starting time of the job Jb, and time t6 is expected (or predicted) ending time of the job Jb. Further, the time t6 is expected starting time of the job Jc, and time t8 is predicted ending time of the job Jc.

In FIG. 13, time t7 is expected ending time of the job Jc, and the predicted ending time t8 of the job Jc is over the expected ending time t7. Further, as the expected ending time t6 of the job Jb equals the expected starting time t6 of the job Jc, it is impractical to bring forward only the expected starting time of the job Jc.

Thus, the changing unit 507 individually changes the expected starting time of the jobs Ja, Jb and Jc which are arranged in order for being carried out so that the predicted ending time of the job Jc is not over the expected ending time t7. For example, the changing unit 507 individually brings forward and changes the expected starting time of the jobs Ja, Jb and Jc by at least T2 (in minutes), i.e., an interval between the expected ending time t7 and the predicted ending time t8 of the job Jc.

As depicted on the lower side in FIG. 13, e.g., the expected starting time of the job Ja is brought forward and changed to time t1 by T2 minutes, the expected starting time of the job Jb is brought forward and changed to time t2 by T2 minutes, and the expected starting time of the job Jc is brought forward and changed to time t4 by T2 minutes. In this case, the predicted ending time of the job Jc is the time t7, and is not over the expected ending time t7 of the job Jc.

Figure 14:
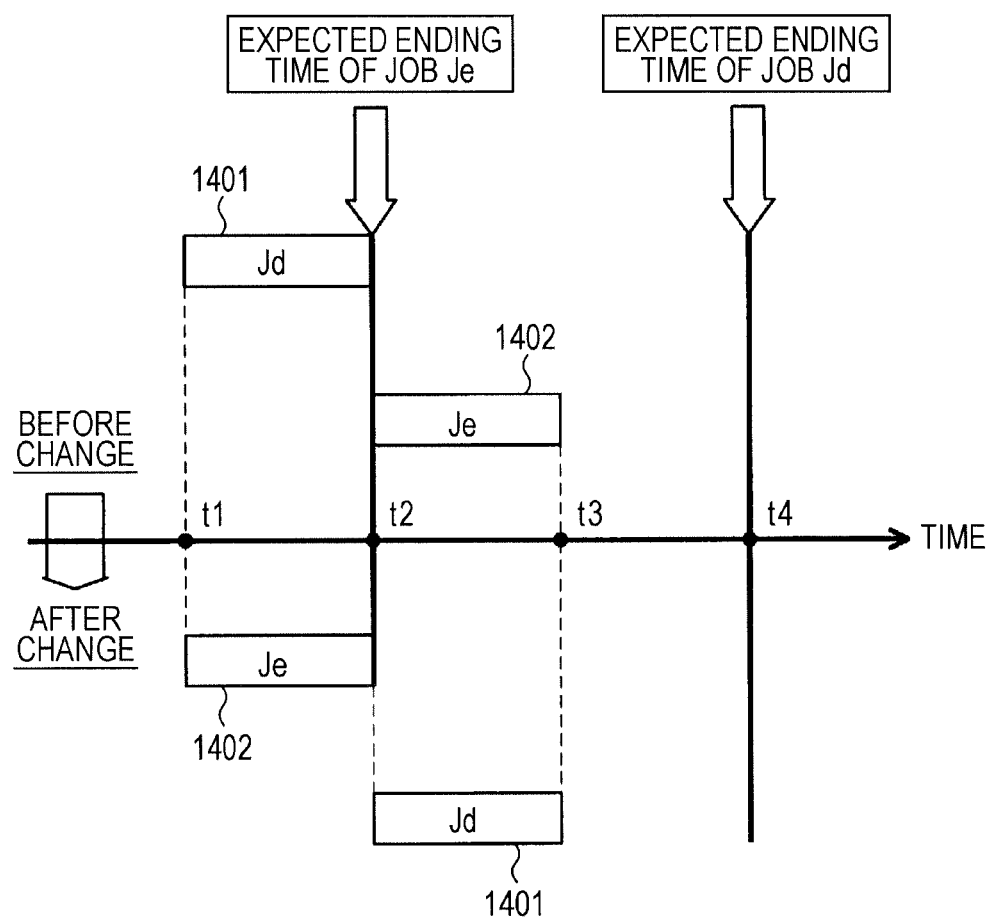
FIG. 14 is a schematic diagram illustrating an example of a change in expected starting time of a job, according to an embodiment.

FIG. 14 is a schematic diagram illustrating an example of a change in the expected starting time of the job J, according to an embodiment. FIG. 14 depicts a Gantt chart 1401 indicating a time range in which the machine M carries out a job Jd. A Gantt chart 1402 indicates a time range in which the machine M carries out a job Je. The jobs Jd and Je are not arranged in order for being carried out. The job Je is a job whose expected starting time is to be changed.

Before the expected starting time of the job Je is changed as depicted on the upper side in FIG. 14, time t1 is expected starting time of the job Jd, and time t2 is expected (or predicted) ending time of the job Jd. Further, the time t2 is expected starting time of the job Je, and time t3 is predicted ending time of the job Je.

In FIG. 14, the time t2 is expected ending time of the job Je, and the predicted ending time t3 of the job Je is over the expected ending time t2. Meanwhile, time t4 is expected ending time of the job Jd, and the predicted ending time of the job Jd is not over the expected ending time t4.

In such a case, the changing unit 507 individually changes the expected starting time of the jobs Jd and Je so that the predicted ending time of the job Jd or Je is not over the expected ending time. For example, the changing unit 507 exchanges the expected starting time of the job Jd for the expected starting time of the job Je, and exchanges the expected starting time of the job Je for the expected starting time of the job Jd.

As depicted on the lower side in FIG. 14, e.g., the expected starting time of the job Jd is changed to the time t2, and the expected starting time of the job Je is changed to the time t1. In this case, the predicted ending time of the job Je is the time t2, and is not over the expected ending time t2 of the job Je. Further, the predicted ending time of the job Jd is the time t3, and is not over the expected ending time t4 of the job Jd.

(Procedure for Managing Jobs by Means of the Job Management Device 201)

Then a procedure for managing jobs by means of the job management device 201 of the second embodiment will be explained.

Figure 15:
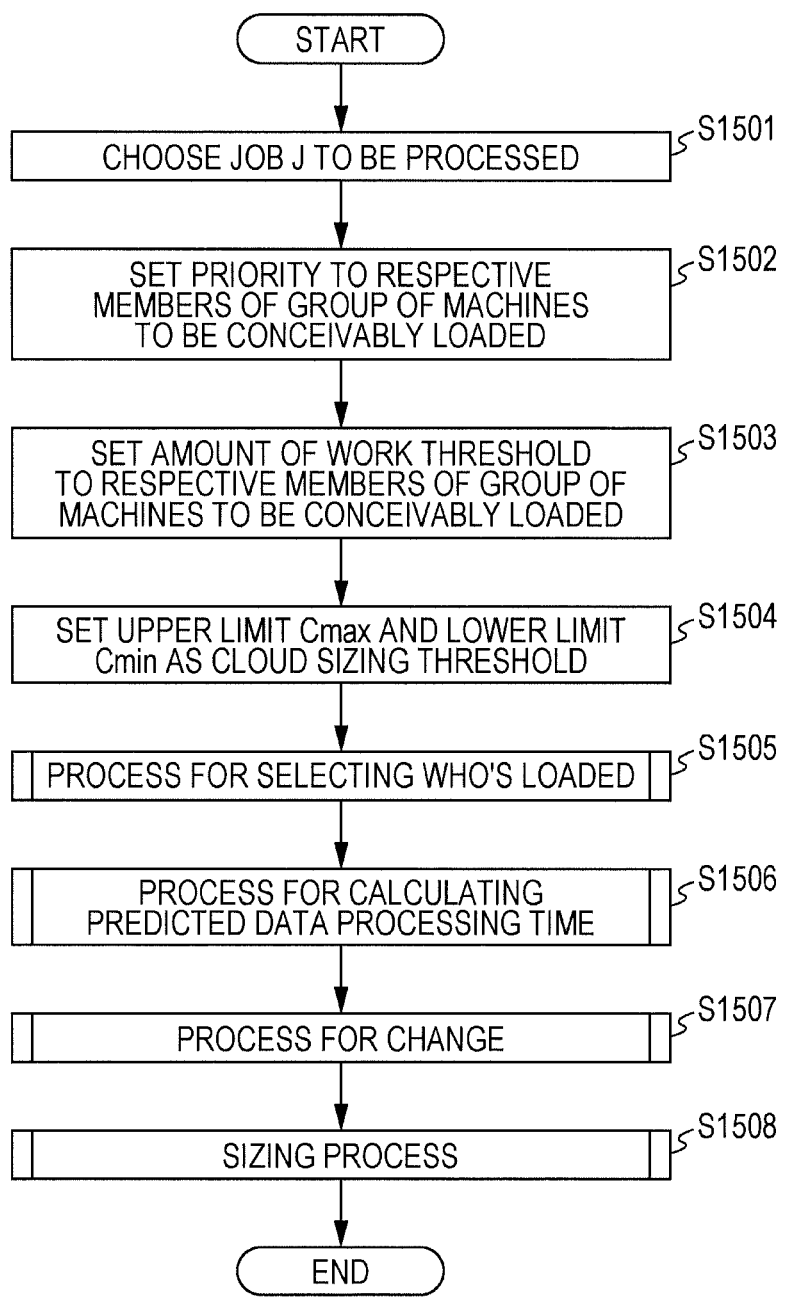
FIG. 15 is a diagram illustrating an example of an operational flowchart for managing jobs by means of a job management device, according to an embodiment.

FIG. 15 is a diagram illustrating an example of an operational flowchart for managing jobs by means of a job management device, according to an embodiment. In the flowchart depicted in FIG. 15, choose a job J to be processed by means of the choosing unit 501 at first (step S1501). Then, set priorities to respective members of a group of machines to be conceivably loaded with the job J by means of the job management device 201 (step S1502).

Further, set a threshold of an amount of work to be loaded onto each of the members of the group of machines to be conceivably loaded with the job J by means of the job management device 201 (step S1503). Further, set upper and lower limits Cmax and Cmin, respectively, of an amount of work loaded onto the cloud environment 203 as a cloud sizing threshold for the cloud environment 203 by means of the job management device 201 (step S1504).

Then, carry out a process for selecting a machine M to be loaded with the job J to be processed by means of the selecting unit 502 (step S1505). Then, carry out a process for calculating predicted processing time for the job J to be processed by means of the first calculating unit 505 (step S1506).

Then, carry out a process for changing expected starting time of the job J to be processed by means of the changing unit 507 (step S1507). Finally, carry out a process for sizing the cloud environment 203 by means of the job management device 201 (step S1508), and finish the consecutive process according to the flowchart.

The expected starting time of the job J may thereby be changed in order that the predicted ending time of the job J is not over the expected ending time.

Incidentally, the various kinds of values may be set at the steps S1502-S1504, e.g., through input operations done by the user on the setting screen 1100 depicted in FIG. 11, or automatically according to a preset schedule.

(Procedure for Selecting Machine to be Loaded)

Then, a specific procedure for the process for selecting a machine to be loaded at the step S1505 will be explained. Let a group of machines to be conceivably loaded with the job J be the machines M1-Mn and the cloud environment 203 depicted in FIG. 2.

Figure 16:
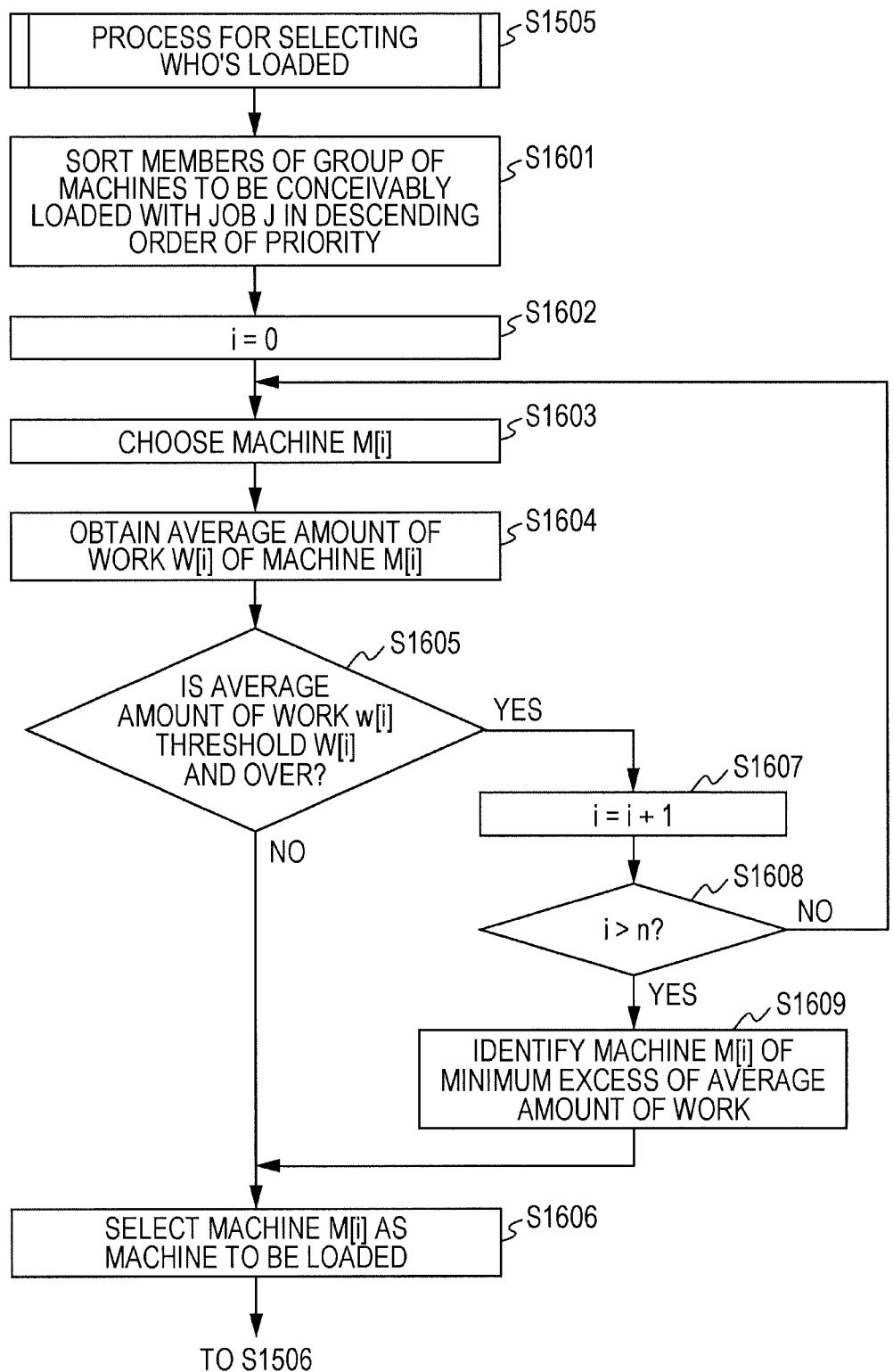
FIG. 16 is a diagram illustrating an example of an operational flowchart for selecting a target computer to be loaded, according to an embodiment.

FIG. 16 is a diagram illustrating an example of an operational flowchart for selecting a target computer to be loaded, according to an embodiment. In the flowchart depicted in FIG. 16, sort members of a group of machines to be conceivably loaded with the job J in descending order of priorities by means of the selecting unit 502 at first (step S1601).

As explained below, suppose that the selecting unit 502 sorts the machines M1-Mn and the cloud environment 203 in descending order of priorities into what is written as "machines M[0]-M[n]". Further, any one of the machines M[0]-M[n] is written as a "machine M[i]" (i is an integer 0 through n).

Then, set "i=0" for the machine M[i] (step S1602), and choose the machine M[i] from the machines M[0]-M[n] by means of the selecting unit 502 (step S1603). Incidentally, when a symbol "×" is set as the priority of the machine M[i], the selecting unit 502 shifts to a step S1609 without choosing the machine M[i] (remark that the priority "×" is treated as the lowest priority).

Then, obtain an average amount of work w[i] of the machine M[i] at particular time (e.g., a couple of years or months in the past) from the information collecting device 202 by means of the selecting unit 502 (step S1604). Then, decide whether the obtained average amount of work w[i] of the machine M[i] is a threshold W[i] of an amount of work set to the machine M[i] and over by means of the selecting unit 502 (step S1605).

When the average amount of work w[i] of the machine M[i] is smaller than the threshold W[i] (step S1605: No), select the machine M[i] as the machine to be loaded with the job J by means of the selecting unit 502 (step S1606), and shift to the step S1506 depicted in FIG. 15.

Meanwhile, when the average amount of work w[i] of the machine M[i] is the threshold W[i] and over (step S1605: Yes), incrementally update "i" of the machine M[i] by means of the selecting unit 502 (step S1607). Then, decide whether "i" of the machine M[i] is greater than "n" by means of the selecting unit 502 (step S1608).

When "i" of the machine M[i] is not greater than "n" (step S1608: No), return to the step S1603. Meanwhile, when "i" of the machine M[i] is greater than "n" (step S1608: Yes), identify, from the machines M[0]-M[n], a machine M[i] whose additional portion of the average amount of work is a minimum by means of the selecting unit 502 (step S1609), and shift to the step S1606.

Incidentally, the additional portion of the average amount of work is a difference between the average amount of work w[i] loaded onto the machine M[i] and the threshold W[i] of the amount of work loaded onto the machine M[i].

Thus, the machine M whose average amount of work at particular time is smaller than a preset threshold of the amount of work may thereby be chosen.

(Procedure for Calculating Predicted Data Processing Time)

Then, a procedure for calculating predicted data processing time at the step S1506 depicted in FIG. 15 will be explained.

Figure 17:
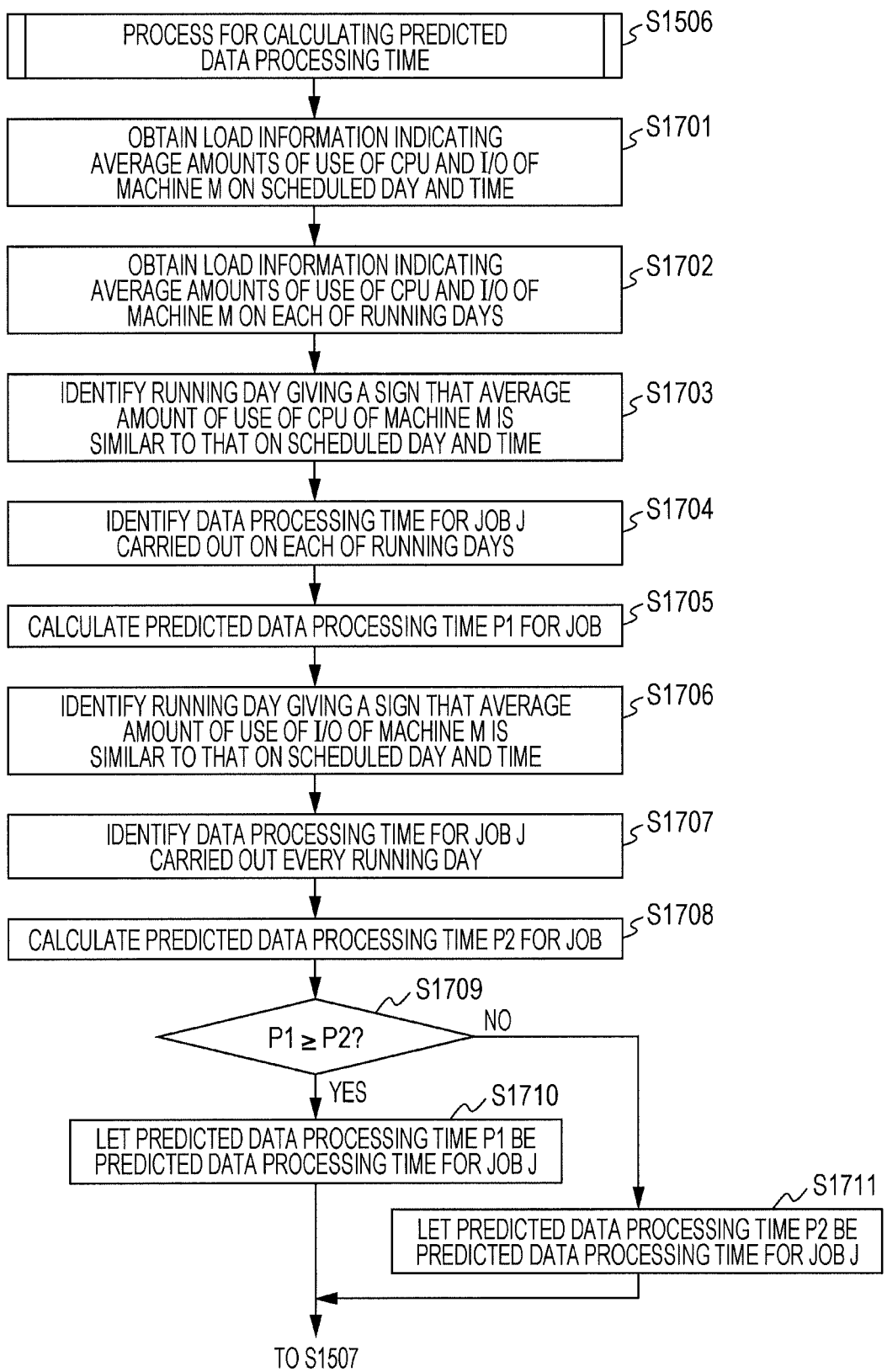
FIG. 17 is a diagram illustrating an example of an operational flowchart for calculating predicted data processing time, according to an embodiment.

FIG. 17 is a diagram illustrating an example of an operational flowchart for calculating predicted data processing time, according to an embodiment. At first in the operational flowchart depicted in FIG. 17, obtain load information indicating average amounts of use of the CPU and the I/O of the machine M in a time range until the scheduled day and time when the job J to be processed starts to be carried out by means of the obtaining unit 503 (step S1701).

Then, obtain load information indicating average amounts of use of the CPU and the I/O of the machine M in the same time range as the time range until the scheduled day and time, on each of running days when the job J was carried out by the machine M at particular time, by means of the obtaining unit 503 (step S1702).

Then, identify one of the running days of the job J giving a sign that the average amount of use of the CPU of the machine M in the same time range as the time range until the scheduled day and time is similar to the average amount of use of the CPU of the machine M in the time range until the scheduled day and time, by means of the identifying unit 504 (step S1703). The identifying unit 504 carries out the process at the step S1703 on the basis of the load information obtained at the steps S1701 and S1702.

Then, identify data processing time for the job J carried out by the machine M on each of the identified running days, by means of the first calculating unit 505 (step S1704). Then, calculate an average length of the data processing time for the job J carried out on the respective identified running days so as to calculate data processing time P1 for the job J, by means of the first calculating unit 505 (step S1705).

Then, identify one of running days of the job J giving a sign that the average amount of use of the I/O of the machine M in the same time range as the time range until the scheduled day and time is similar to the average amount of use of the I/O of the machine M in the time range until the scheduled day and time by means of the identifying unit 504 (step S1706). The identifying unit 504 carries out the process at the step S1706 on the basis of the load information obtained at the steps S1701 and S1702.

Then, identify data processing time for the job J carried out by the machine M on each of the identified running days, by means of the first calculating unit 505 (step S1707). Then, calculate an average length of the data processing time for the job J carried out on the respective identified running days so as to calculate data processing time P2 for the job J by means of the first calculating unit 505 (step S1708).

Then, decide whether the calculated predicted data processing time P1 is not shorter than the predicted data processing time P2, by means of the first calculating unit 505 (step S1709). When the predicted data processing time P1 is not shorter than the predicted data processing time P2 (step S1709: Yes), let the predicted data processing time P1 be the data processing time for the job by means of the first calculating unit 505 (step S1710), and shift to the step S1507 depicted in FIG. 15.

Meanwhile, when the predicted data processing time P1 is shorter than the predicted data processing time P2 (step S1709: No), let the predicted data processing time P2 be the data processing time for the job J by means of the first calculating unit 505 (step S1711), and shift to the step S1507 depicted in FIG. 15.

The job management device 201 may thereby calculate predicted data processing time for the job J on the scheduled day on the basis of the data processing time for the job J carried out in the past in load condition similar to the load condition of the machine M in the time range until the scheduled day and time.

Procedure for Changing Process

Then, a specific procedure for the changing process at the step S1507 depicted in FIG. 15 will be explained.

Figure 18:
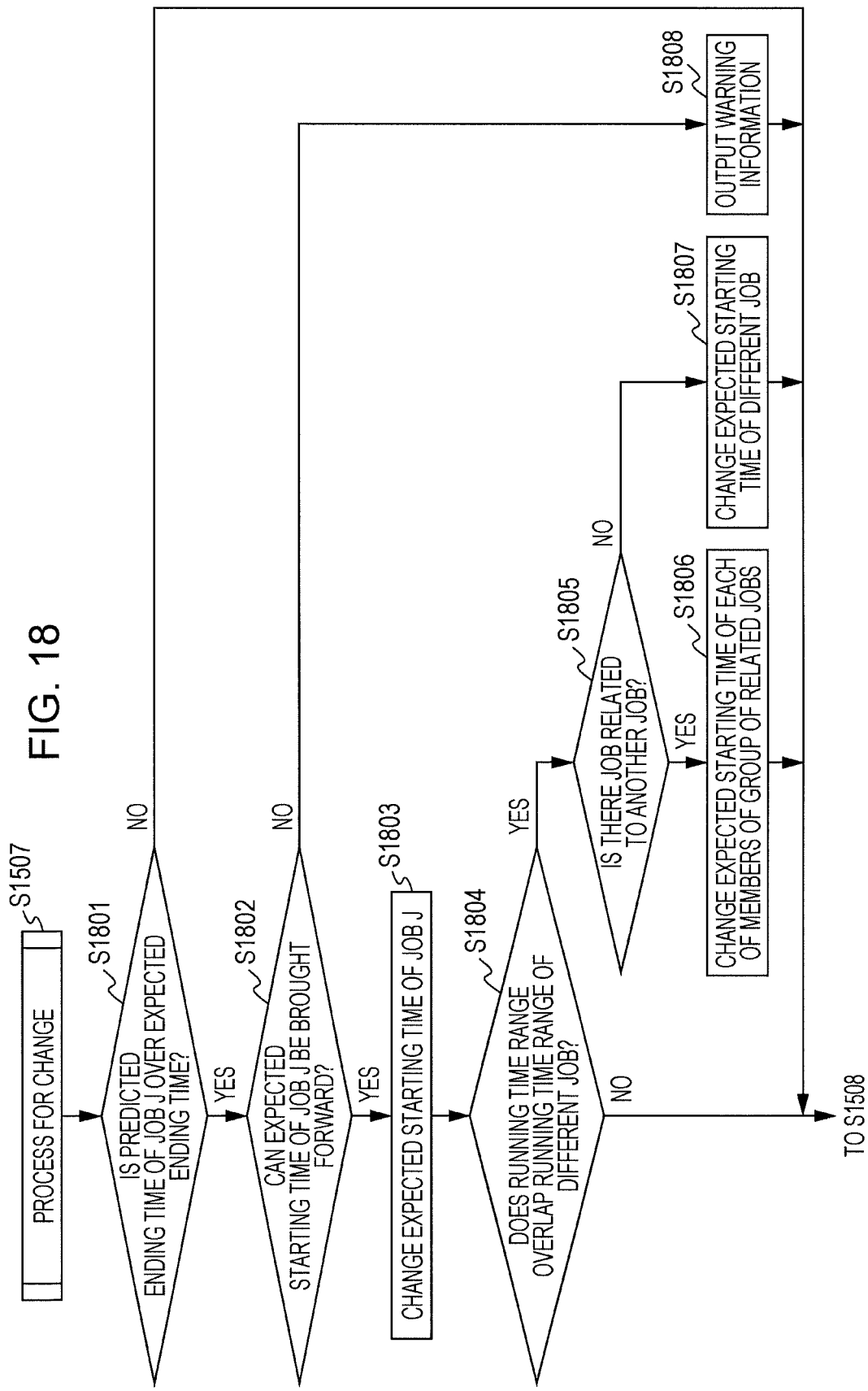
FIG. 18 is a diagram illustrating an example of an operational flowchart for changing a starting time of a job, according to an embodiment.

FIG. 18 is a diagram illustrating an example of an operational flowchart for changing a starting time of a job, according to an embodiment. At first in the flowchart in FIG. 18, decide whether the predicted ending time after the expected starting time of the job J by the calculated predicted processing time for the job J is over the expected ending time of the job J, by means of the deciding unit 506 (step S1801).

When the predicted ending time of the job J is not over the expected ending time (step S1801: No), shift to the step S1508 depicted in FIG. 15. Meanwhile, when the predicted ending time of the job J is over the expected ending time (step S1801: Yes), decide whether the expected starting time of the job J is allowed to be brought forward, by means of the changing unit 507 (step S1802).

When the expected starting time of the job J is allowed to be brought forward (step S1802: Yes), change the expected starting time of the job J in order that the predicted ending time of the job J is not over the expected ending time, by means of the changing unit 507 (step S1803).

Then, after changing the expected starting time of the job J, decide whether running time ranges in which the job J and another different job are carried out resultantly overlap each other, by means of the changing unit 507 (step S1804). When the running time ranges do not overlap with the different job (step S1804: No), shift to the step S1508 depicted in FIG. 15.

Meanwhile, when the running time ranges overlap with the different job (step S1804: Yes), decide whether there is a job related to the different job, by means of the changing unit 507 (step S1805). Incidentally, related information for identifying a related group of jobs is included, e.g., in the schedule information 400-1 through 400-m depicted in FIG. 4.

When there is a related job (step S1805: Yes), change expected starting time of each of jobs in the related group of jobs, by means of the changing unit 507, in order that the predicted ending time of each of the jobs is not over the expected ending time (step S1806). Then, shift to the step S1508 depicted in FIG. 15.

Meanwhile, when there is no related job (step S1805: No), change the expected starting time of the different job, by means of the changing unit 507, in order that the predicted ending time of the different job is not over the expected ending time (step S1807), and shift to the step S1508 depicted in FIG. 15.

Further, when it is impractical to bring forward the expected starting time of the job J at the step S1802 (step S1802: No), output warning information indicating that the predicted ending time of the job J is over the expected ending time, by means of the output unit 509 (step S1808). Then, shift to the step S1508 depicted in FIG. 15.

The expected starting time of the job J may thereby be changed in order that the overlap degree with the different job does not grow and that the predicted ending time of the job J is not over the expected ending time.

Incidentally, when it is impractical to change the expected starting time of each of the jobs in the related group of jobs at the step S1806 in order that the predicted ending time of each of the jobs is not over the expected ending time, the output unit 509 may output warning information indicating such condition.

When it is similarly impractical to change the expected starting time of the different job at the step S1807 in order that the predicted ending time of the different job is not over the expected ending time, the output unit 509 may output warning information indicating such condition.

(Procedure for Sizing Process)

Then, a specific procedure for the sizing process at the step S1508 depicted in FIG. 15 will be explained.

Figure 19:
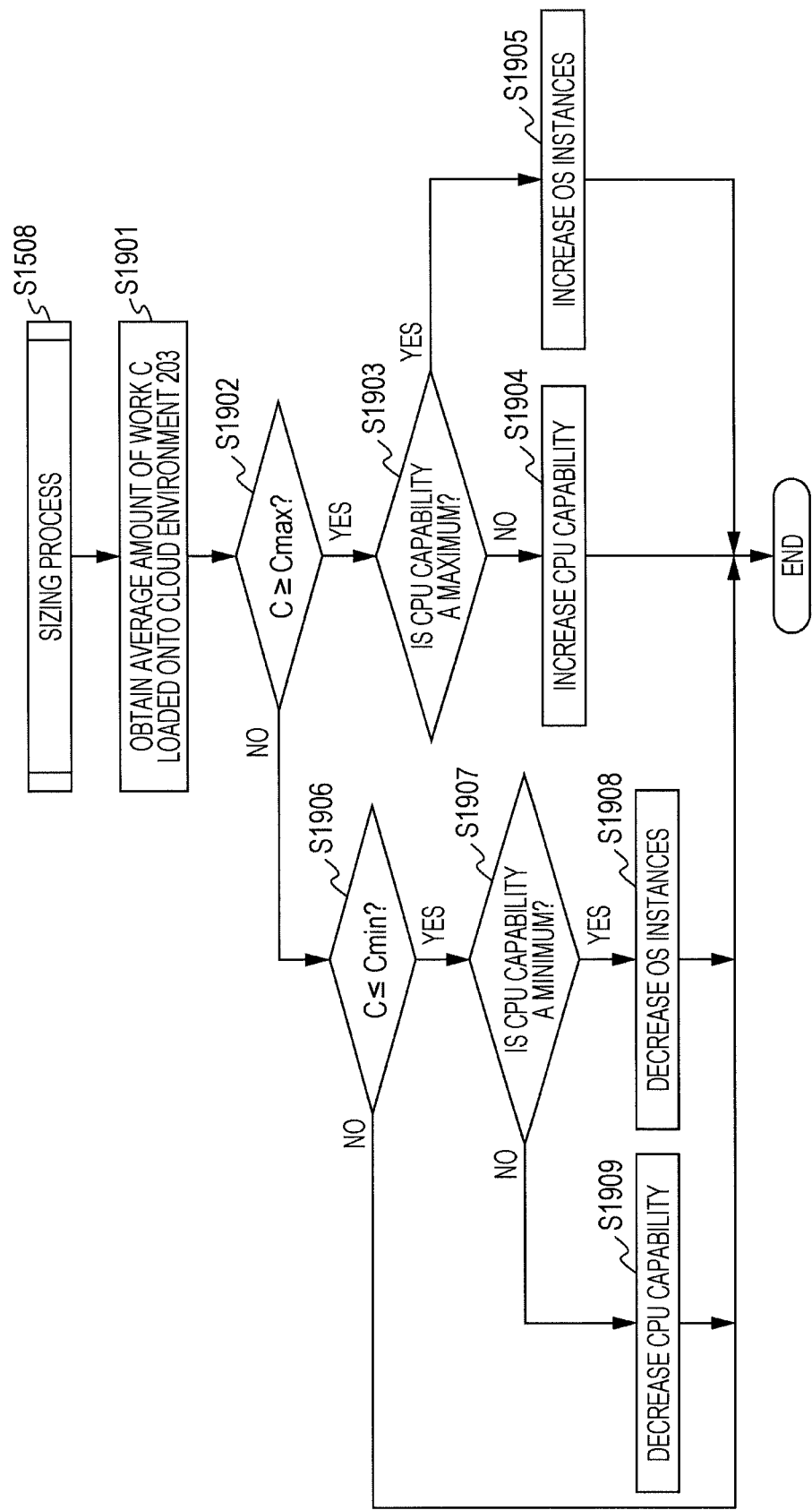
FIG. 19 is a diagram illustrating an example of an operational flowchart for a sizing process, according to an embodiment.

FIG. 19 is a diagram illustrating an example of an operational flowchart for a sizing process, according to an embodiment. At first in the operational flowchart in FIG. 19, obtain an average amount of work C loaded onto a group of servers included in the cloud environment 203 (average amount of use of CPUs in this case) from the information collecting device 202, by means of the job management device 201 (step S1901).

Incidentally, the group of servers included in the cloud environment 203 means operating system (OS) instances in the cloud environment 203.

Then, decide whether the obtained average amount of work C loaded onto the cloud environment 203 is not smaller than the upper limit Cmax of the cloud sizing threshold (step S1902). When the average amount of work C is not smaller than the upper limit Cmax (step S1902: Yes), decide whether the CPU capability of the OS instances is a maximum, by means of the job management device 201 (step S1903).

When the CPU capability of the OS instances is not a maximum (step S1903: No), increase the CPU capability of the OS instances by means of the job management device 201 (step S1904), and finish the consecutive process according to the flowchart.

Meanwhile, when the CPU capability of the OS instances is a maximum (step S1903: Yes), increase the number of the OS instances by means of the job management device 201 (step S1905), and finish the consecutive process according to the flowchart.

Further, when the average amount of work C is smaller than the upper limit Cmax at the step S1902 (step S1902: No), decide whether the obtained average amount of work C of the cloud environment 203 is not greater than the lower limit Cmin of the cloud sizing threshold, by means of the job management device 201 (step S1906).

When the average amount of work C is not greater than the lower limit Cmin (step S1906: Yes), decide whether the CPU capability of the OS instances is a minimum (step S1907). When the CPU capability of the OS instances is a minimum (step S1907: Yes), decrease the number of the OS instances by means of the job management device 201 (step S1908), and finish the consecutive process according to the flowchart.

Meanwhile, when the CPU capability of the OS instances is not a minimum (step S1907: No), decrease the CPU capability of the OS instances by means of the job management device 201 (step S1909), and finish the consecutive process according to the flowchart.

Further, when the average amount of work C is greater than the lower limit Cmin at the step S1906 (step S1906: No), finish the consecutive process according to the flowchart.

The job management device 201 may thereby increase or decrease the number of OS instances or the CPU capability in accordance with the work loaded onto the cloud environment 203, so that a service provided by a job allotted to the cloud environment 203 do not delay and that wasteful use of computing resources is controlled.

Incidentally, although an average amount of use of the CPUs is used as an average amount of work C loaded onto the group of servers included in the cloud environment 203 as explained above, an average amount of use of the I/Os may be used instead. In this case, what is increased or decreased in time of sizing the cloud environment 203 is memories and OS instances.

(Machine Replacement)

Then, machine replacement in the scheduling system 200 will be explained. The machine replacement means replacing an old or broken machine with a new machine.

Figure 20:
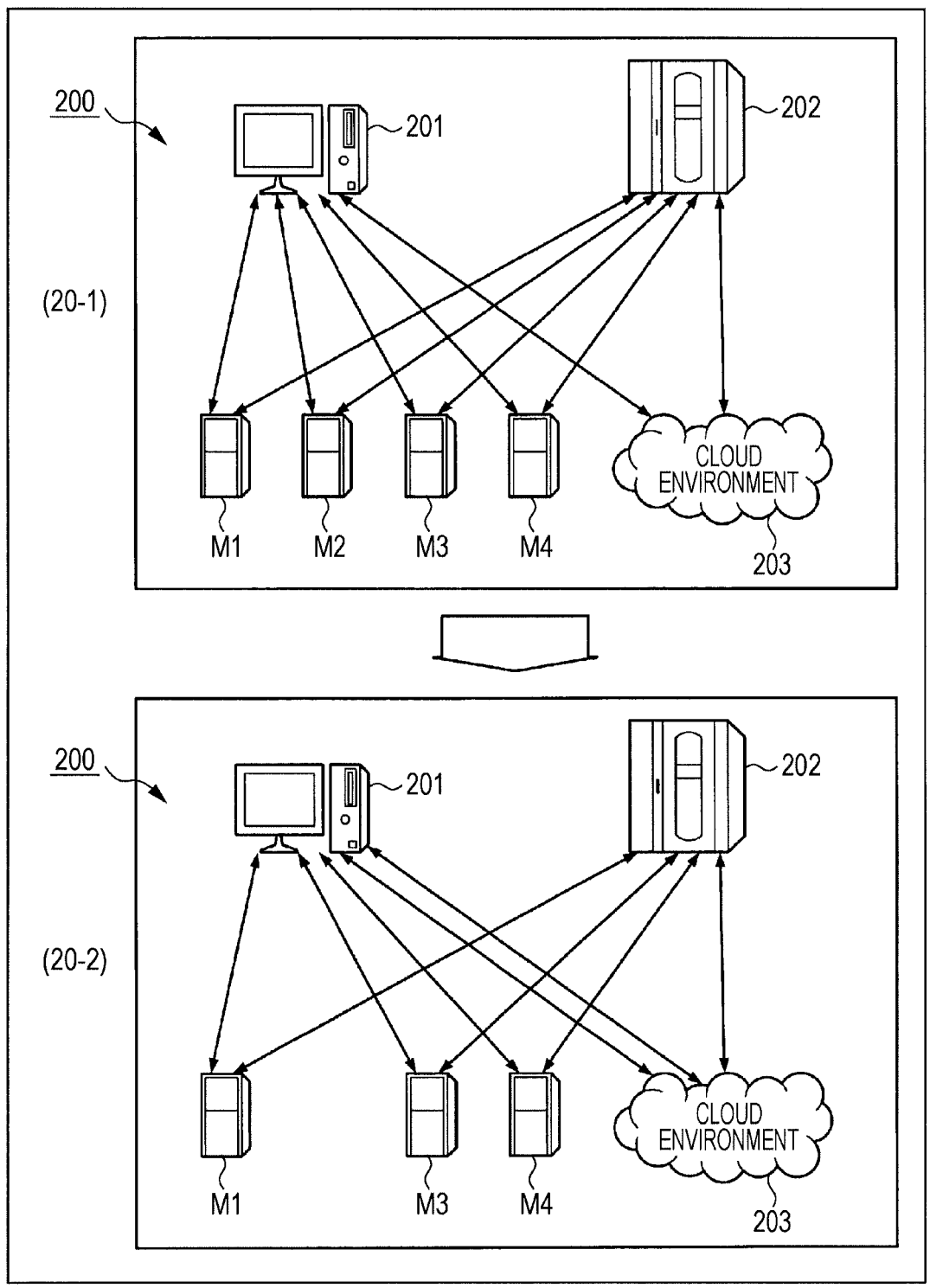
FIG. 20 is a schematic diagram illustrating an example of an operation for machine replacement, according to an embodiment.

FIG. 20 is a schematic diagram illustrating an example of an operation for machine replacement, according to an embodiment. The upper half (20-1) in FIG. 20 depicts the machines M1-M4 and the cloud environment 203. Let the machine M2 be a machine to be replaced.

In this case, set the symbol "×" to the priorities of the machines M1-M4 on the setting screen 1100 concerning a group of jobs used to be expected to be carried out by the machine M2 to be replaced, so that the machines M1-M4 are excluded from candidates conceivably loaded with the group of jobs.

Further, set "1" to the priority of the cloud environment 203 on the setting screen 1100 concerning the group of jobs used to be expected to be carried out by the machine M2 to be replaced. As a result, the job management device 201 may allot the group of jobs to the cloud environment 203 so that predicted ending time of each of the jobs in the group that are expected to be carried out by the machine M2 is not over its expected ending time (see the lower half (20-2) in FIG. 20).

Let the cloud environment 203 temporarily carry out the group of jobs expected to be carried out by the machine M2 to be replaced, in time of machine replacement in the operation environment, in this way, so that an environmental change in time of machine replacement is flexibly dealt with.

(Shift to Cloud)

Then, a case where a group of jobs used to be expected to be carried out by the machines M1-M4 in the scheduling system 200 is shifted to the cloud environment 203 will be explained.

Figure 21:
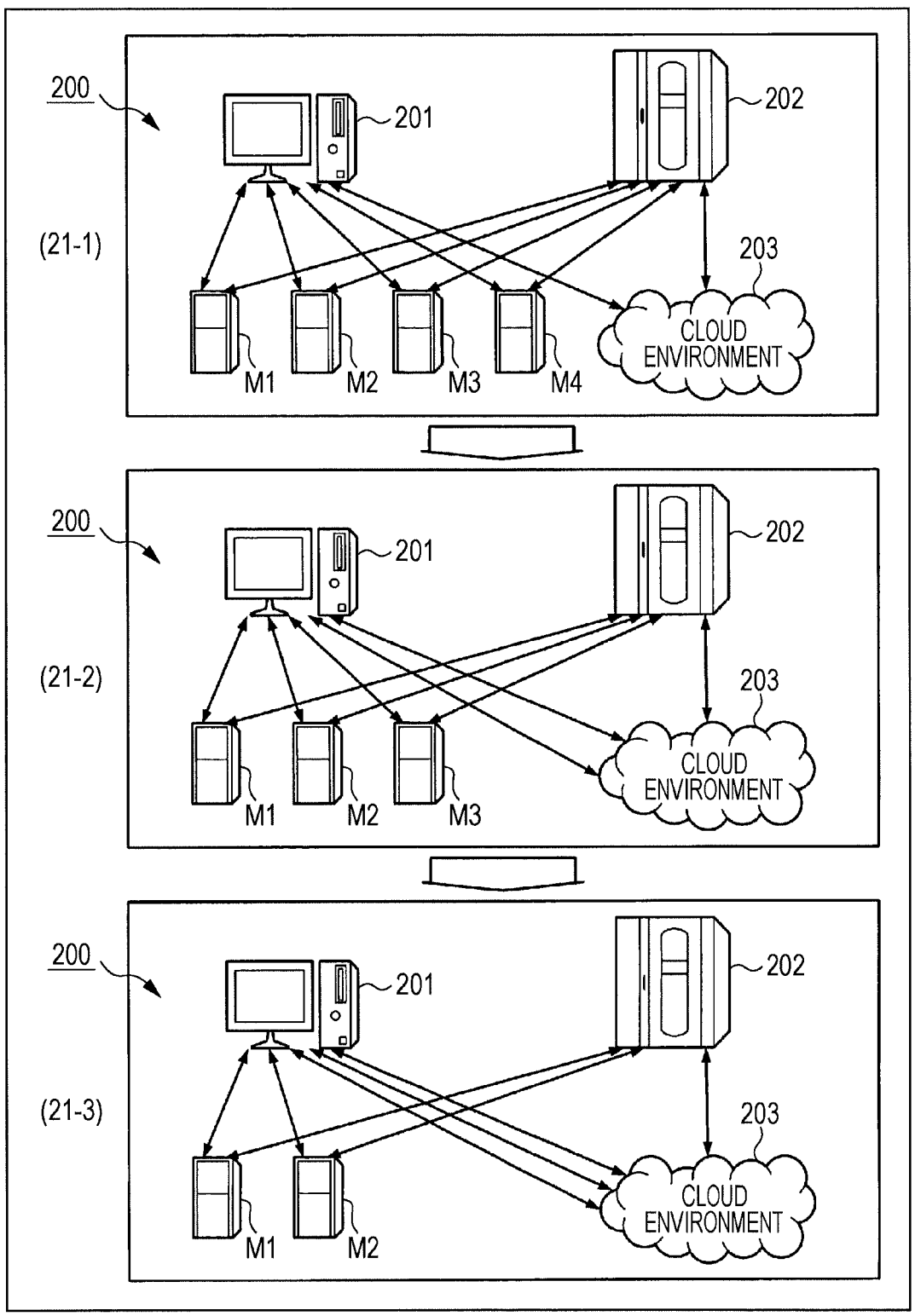
FIGS. 21 and 22 are diagrams illustrating an example of operations in time of a shift to a cloud environment, according to an embodiment.
Figure 22:
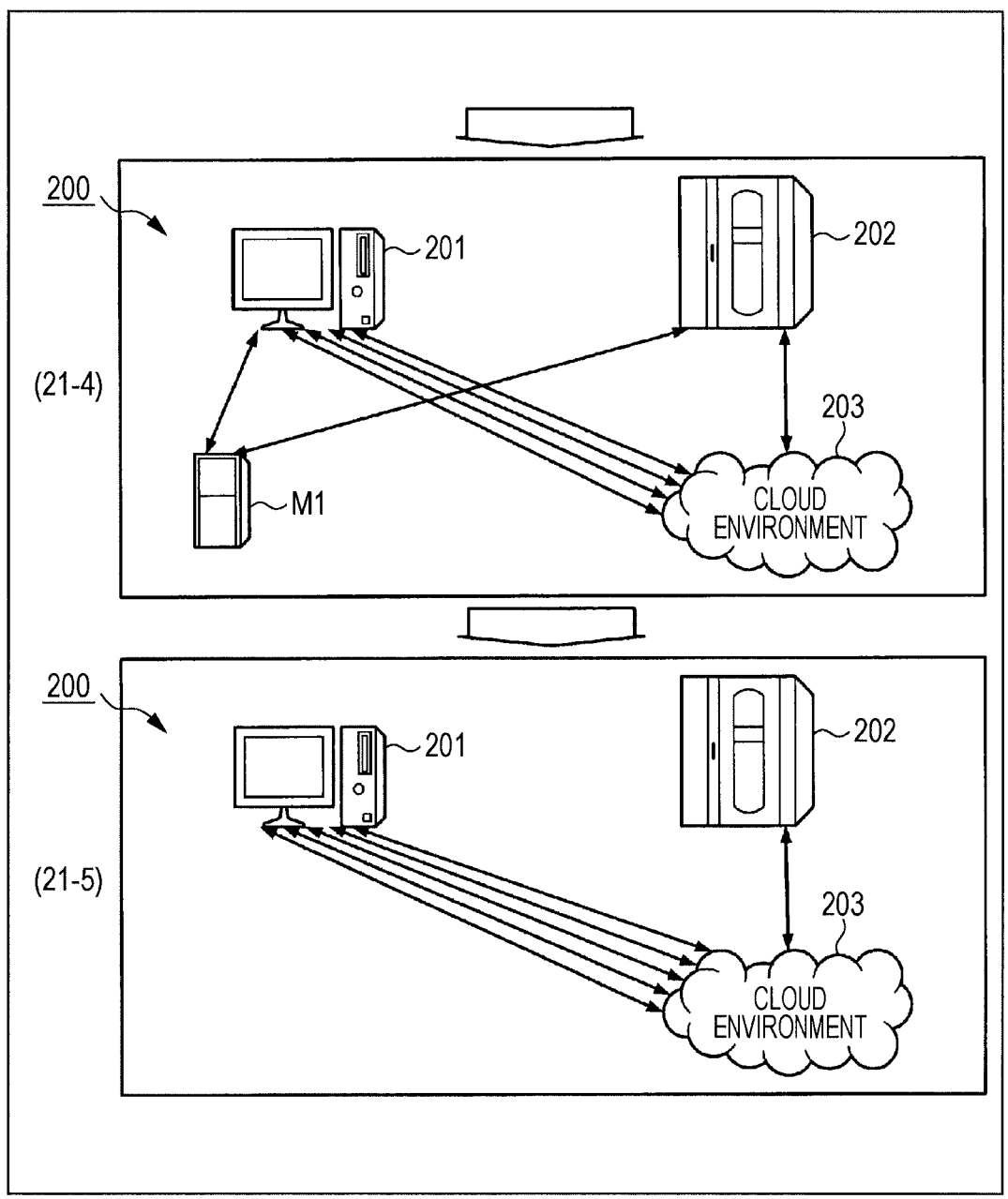

FIGS. 21 and 22 are diagrams illustrating an example of operations in time of a shift to a cloud environment, according to an embodiment. The machines M1-M4 and the cloud environment 203 are depicted in (21-1) in FIG. 21.

Let the machine M4 be an object of the shift. In this case, set the symbol "×" to the priorities of the machines M1-M4 and set "1" to the priority of the cloud environment 203 on the setting screen 1100 concerning a group of jobs used to be expected to be carried out by the machine M4 to be an object of the shift.

As a result, the job management device 201 may allot the group of jobs to the cloud environment 203 so that predicted ending time of each of the jobs in the group used to be expected to be carried out by the machine M4 is not over its expected ending time (see (21-2) in FIG. 21).

Then, let the machine M3 be an object of the shift. In this case, set the symbol "×" to the priorities of the machines M1-M4 and set "1" to the priority of the cloud environment 203 on the setting screen 1100 concerning a group of jobs used to be expected to be carried out by the machine M3 to be an object of the shift.

As a result, the job management device 201 may allot the group of jobs to the cloud environment 203 so that predicted ending time of each of the jobs in the group used to be expected to be carried out by the machine M3 is not over its expected ending time (see (21-3) in FIG. 21).

Then, let the machine M2 be an object of the shift. In this case, set the symbol "×" to the priorities of the machines M1-M4 and set "1" to the priority of the cloud environment 203 on the setting screen 1100 concerning a group of jobs used to be expected to be carried out by the machine M2 to be an object of the shift.

As a result, the job management device 201 may allot the group of jobs to the cloud environment 203 so that predicted ending time of each of the jobs in the group used to be expected to be carried out by the machine M2 is not over its expected ending time (see (21-4) in FIG. 22).

Then, let the machine M1 be an object of the shift. In this case, set the symbol "×" to the priorities of the machines M1-M4 and set "1" to the priority of the cloud environment 203 on the setting screen 1100 concerning a group of jobs used to be expected to be carried out by the machine M1 to be an object of the shift.

As a result, the job management device 201 may allot the group of jobs to the cloud environment 203 so that predicted ending time of each of the jobs in the group used to be expected to be carried out by the machine M1 is not over its expected ending time (see (21-5) in FIG. 22).

All the jobs used to be expected to be carried out by the machines M1-M4 in the scheduling system 200 are shifted to the cloud environment 203, in this way, by gradually increasing a percentage of the jobs to be carried out by the cloud environment 203, so that the shift to the cloud is seamlessly achieved.

The job management device 201 of the second embodiment described above may calculate the predicted data processing time for the job J on the scheduled day on the basis of the data processing time for the job J carried out on a running day in the past giving a sign that the load condition of the machine M is similar to the load condition on the scheduled day in the same time range as the time range until the scheduled day and time.

Further, the job management device 201 may identify running days D1-DK each giving a sign that a difference between an average amount of work loaded onto the machine M in the time range until the scheduled day and time and an average amount of work loaded onto the machine M in the same time range on the running days in the past when the job J was carried out is not greater than a threshold. The job management device 201 may thereby identify the running days in the past when the job J was carried out in load condition similar to the load condition in the time range until the scheduled day and time.

Further, the job management device 201 may identify running days D1-DK each giving a sign that a difference between an average amount of work loaded onto the machine M in the time range until the scheduled day and time and an average amount of work loaded onto the machine M in the same time range on the running days in the past when the job J was carried out has one of the smallest K values. The job management device 201 may identify the running days in the past when the job J was carried out in load condition similar to the load condition in the time range until the scheduled day and time.

Further, when the predicted ending time after the expected starting time of the job J by the predicted processing time for the job J is over the expected ending time of the job J, the job management device 201 may output warning information indicating that the predicted ending time of the job J is over the expected ending time. The user may thereby be aware that the predicted ending time of the job J is over the expected ending time, and may take action such as to change expected starting time of the job J so that the job J will finish being carried out before the expected ending time.

Further, when the predicted ending time of the job J is over the expected ending time, the job management device 201 may change the expected starting time of the job J to be carried out at that time. The user may thereby be aware of the expected starting time of the job J after which the predicted ending time of the job J is not over the expected ending time. Further, the job management device 201 may provide an existing scheduler with the expected starting time of the job J having been changed so as to schedule the job J to finish being carried out before the expected ending time.

Further, the job management device 201 may calculate a progress percentage of a job J that has started being carried out on that day, on the basis of starting time of the job J, the present time, and predicted data processing time for the job J, and present the calculated progress percentage on the progress status screen 1000. The user may thereby be aware of the progress percentage of the job J.

Further, the job management device 201 may choose a machine M to be loaded with a job J to be processed on the basis of priorities set to respective machines to be conceivably loaded with the job J. The user may thereby operate the scheduling system 200 in such a way that a machine M of high performance carries out a job J being important and that a machine M of low performance carries out a job J being not so important.

Further, the job management device 201 may choose a machine M whose amount of work is smaller than a preset threshold of the amount of work as the machine to be loaded with the job J to be processed. The job management device 201 may thereby avoid a situation in which the job J is allotted to the machine M to be loaded resulting in that the machine M is loaded too much and that the data processing time for the job J is extended.

Further, set a lower priority to the cloud environment 203 than priorities set to the machines M1-Mn in an on-premises environment, so that the cloud environment 203 is operated to carry out the job J only in a case where the machines in the on-premises environment are heavily loaded. As a result, use of the cloud environment 203 may be charged at a rate as low as possible and the charge may be minimized.

It may be concluded from the above that the job management device 201 may optimize the expected starting time of the job J in accordance with load condition of the machine M which changes depending upon an amount of work or data size which changes day by day so that the job J finishes being carried out within specified time.

Incidentally, the prediction method of the embodiment explained above may be implemented by means of a prepared program run on a computer such as a personal computer or a workstation. The prediction program may be recorded on a computer-readable recording medium such as a hard disk, a flexible disk, a CD-ROM, an MO, a DVD, etc. The prediction program may be read from the recording medium and run by the computer. Further, the prediction program may be distributed via a network such as the Internet.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A computer-readable, non-transitory medium storing instructions for allowing a computer system to execute a procedure comprising:
    receiving load information and a first processing time in association with each of a plurality of first time segments that each have a fixed duration time and are included in a first time period, the load information indicating a load condition of a target computer that executed a target job during the each of the plurality of first time segments, the first processing time indicating a running time of the target job during the each of the plurality of first time segments;
    selecting from among the plurality of first time segments, one or more first time segments each having a predetermined analogous relationship with a second time segment included in a second time period during which the target job is expected to be executed by the target computer, based on the load information associated with the plurality of first time segments; and
    predicting a second processing time indicating a running time of the target job that is expected to be executed during the second time period, based on the first processing time associated with the selected one or more first time segments, wherein
    the load information includes an average value of load amounts that were imposed on the target computer during each of the plurality of first time segments; and
    it is determined that one of the plurality of time segments in the first time period has the predetermined analogous relationship with the second time segment, based on a difference between an average value of load amounts imposed on the target computer during the one of the plurality of first time segments and an average value of load amounts imposed on the target computer during the second time segment in the second time period.

2. The computer-readable, non-transitory medium of claim 1, wherein
    the load information includes an average value of load amounts that were imposed on the target computer during each of the plurality of first time segments; and
    it is determined that one of the plurality of time segments in the first time period has the predetermined analogous relationship with the second time segment when a difference between an average value of load amounts imposed on the target computer during the one of the plurality of first time segments and an average value of load amounts imposed on the target computer during the second time segment in the second time period is equal to or less than a predetermined threshold value.

3. The computer-readable, non-transitory medium of claim 1, wherein
    the load information includes an average value of load amounts that were imposed on the target computer during each of the plurality of first time segments; and
    it is determined that one of the plurality of first time segments in the first time period has the predetermined analogous relationship with the second time segment when a difference between the average value of load amounts imposed on the target computer during the one of the plurality of first time segments and the average value of load amounts imposed on the target computer during the second time segment in the second time period is one of a predetermined number of least difference values among the plurality of first time segments.

4. The computer-readable, non-transitory medium of claim 1, wherein
    the predicting the second processing time is performed by:
        calculating an average length of the first processing times associated with the selected one or more first time segments; and
        determining the calculated average length to be the second processing time.

5. The computer-readable, non-transitory medium of claim 1, wherein the procedure further comprising:
    setting an expected starting time and an expected ending time to the target job that is expected to be executed by the target computer during the second time period;
    obtaining a predicted ending time of the target job by adding the second processing time to the expected starting time;
    determining whether, in the second time period, the obtained predicted ending time of the target job exceeds the expected ending time of the target job; and
    outputting, when the predicted ending time exceeds the expected ending time, information indicating that the predicted ending time exceeds the expected ending time.

6. The computer-readable, non-transitory medium of claim 5, wherein the procedure further comprising:
    changing, when the predicted ending time exceeds the expected ending time, the expected starting time so that the predicted ending time does not exceed the expected ending time; and
    outputting the changed expected starting time.

7. The computer-readable, non-transitory medium of claim 1, wherein the procedure further comprising:
    setting an expected starting time and an expected ending time to the target job that is expected to be executed by the target computer during the second time period;
    calculating a progress value indicating to what extent the target job has progressed, based on the expected starting time, the expected ending time, and the second processing time; and
    outputting the calculated progress value.

8. The computer-readable, non-transitory medium of claim 1, wherein the load information includes information on amounts of use of a central processing unit (CPU) of the target computer and/or amounts of use of input/output (I/O) devices of the target computer.

9. The computer-readable, non-transitory medium of claim 1, wherein
    the plurality of first time segments each occupy the same time zone that is allocated repeatedly at predetermined intervals within the first time period.

10. An apparatus for predicting a processing time of a computer, the apparatus comprising:
    a memory to store load information and a first processing time in association with each of a plurality of first time segments that each have a fixed duration time and are included in a first time period, the load information indicating a load condition of a target computer that executed a target job during the each of the plurality of first time segments, the first processing time indicating a running time of the target job during the each of the plurality of first time segments; and a processor to:
- select, from among the plurality of first time segments, one or more first time segments each having a predetermined analogous relationship with a second time segment included in a second time period during which the target job is expected to be executed by the target computer, based on the load information associated with the plurality of first time segments, and
- predict a second processing time indicating a running time of the target job that is expected to be executed during the second time period, based on the first processing time associated with the selected one or more first time segments, wherein the load information includes an average value of load amounts that were imposed on the target computer during each of the plurality of first time segments; and it is determined that one of the plurality of time segments in the first time period has the predetermined analogous relationship with the second time segment, based on a difference between an average value of load amounts imposed on the target computer during the one of the plurality of first time segments and an average value of load amounts imposed on the target computer during the second time segment in the second time period.

11. A method for predicting a processing time of a computer, the method comprising:

receiving, by a computer system, load information and a first processing time in association with each of a plurality of first time segments that each have a fixed duration time and are included in a first time period, the load information indicating a load condition of a target computer that executed a target job during the each of the plurality of first time segments, the first processing time indicating a running time of the target job during the each of the plurality of first time segments;

selecting, by the computer system, from among the plurality of first time segments, one or more first time segments each having a predetermined analogous relationship with a second time segment included in a second time period during which the target job is expected to be executed by the target computer, based on the load information associated with the plurality of first time segments; and predicting, by the computer system, a second processing time indicating a running time of the target job that is expected to be executed during the second time period, based on the first processing time associated with the selected one or more first time segments, wherein the load information includes an average value of load amounts that were imposed on the target computer during each of the plurality of first time segments; and it is determined that one of the plurality of time segments in the first time period has the predetermined analogous relationship with the second time segment, based on a difference between an average value of load amounts imposed on the target computer during the one of the plurality of first time segments and an average value of load amounts imposed on the target computer during the second time segment in the second time period.

* * * * *